US012439785B2

(12) United States Patent
Wu et al.

(10) Patent No.: US 12,439,785 B2
(45) Date of Patent: Oct. 7, 2025

(54) DISPLAY PANEL AND DISPLAY APPARATUS

(71) Applicants: Wuhan Tianma Microelectronics Co., Ltd., Wuhan (CN); Wuhan Tianma Microelectronics Co., Ltd. Shanghai Branch, Shanghai (CN)

(72) Inventors: Yingying Wu, Wuhan (CN); Peng Zhang, Wuhan (CN)

(73) Assignees: WUHAN TIANMA MICROELECTRONICS CO., LTD., Wuhan (CN); WUHAN TIANMA MICROELECTRONICS CO., LTD. SHANGHAI BRANCH, Shanghai (CN)

( * ) Notice: Subject to any disclaimer, the term of this patent is extended or adjusted under 35 U.S.C. 154(b) by 364 days.

(21) Appl. No.: 18/110,905

(22) Filed: Feb. 17, 2023

(65) Prior Publication Data

US 2024/0196673 A1    Jun. 13, 2024

(30) Foreign Application Priority Data

Dec. 12, 2022    (CN) .......................... 202211591274.3

(51) Int. Cl.
*H10K 59/131*    (2023.01)
*G06F 3/044*    (2006.01)
(Continued)

(52) U.S. Cl.
CPC .......... *H10K 59/131* (2023.02); *G06F 3/0446* (2019.05); *H10D 89/811* (2025.01); *H10K 59/40* (2023.02)

(58) Field of Classification Search
CPC .... G06F 3/04164; G06F 3/041; G06F 3/0446; G06F 3/0412; H10K 59/40; H10K 59/131; H10D 89/811
See application file for complete search history.

(56) References Cited

U.S. PATENT DOCUMENTS 11,515,369 B2 * 11/2022 Park ..................... H10K 59/352
2019/0064979 A1 * 2/2019 Liu ........................ G06F 3/047
(Continued)

FOREIGN PATENT DOCUMENTS

CN    206619115       11/2017
CN    107479283 A    12/2017
(Continued)

OTHER PUBLICATIONS

The First Office Action for CN Application No. 202211591274.3, dated Jun. 27, 2025, 18 pages.

*Primary Examiner* — Deeprose Subedi

(74) *Attorney, Agent, or Firm* — East IP P.C.

(57) ABSTRACT

The embodiments of the application provides a display panel and a display apparatus. The display panel includes a display area and a non-display area, the non-display area includes a transfer area and a binding area, the transfer area is located at a side of the binding area close to the display area, and the transfer area includes: a first transfer unit electrically connected with a first ground line, and a second transfer unit electrically connected with a first touch signal line; the binding area includes a first binding pad and a second binding pad; the first transfer unit and the first binding pad are electrically connected through a second ground line, and the second transfer unit and the second binding pad are electrically connected through a second touch signal line; an impedance of the second ground line is smaller than that of the second touch signal line.

20 Claims, 14 Drawing Sheets

(51) Int. Cl.
*H01L 27/02* (2006.01)
*H10D 89/60* (2025.01)
*H10K 59/40* (2023.01)

(56) References Cited

U.S. PATENT DOCUMENTS

2022/0107706 A1\* 4/2022 Lu ........................ H10D 86/441
2025/0085597 A1\* 3/2025 Hao .................... G02F 1/13458

FOREIGN PATENT DOCUMENTS

| CN | 107507827 | A | 12/2017 |
| CN | 110676253 | A | 1/2020 |
| CN | 109920935 | B | 8/2021 |
| CN | 114220807 | A | 3/2022 |
| KR | 100716932 | B1 | 5/2007 |
| KR | 20170132942 | A | 12/2017 |

\* cited by examiner

111

112

DISPLAY PANEL AND DISPLAY APPARATUS

CROSS REFERENCE TO RELATED APPLICATION

This application claims priority to Chinese Patent Application No. 202211591274.3, filed on Dec. 12, 2022, which is hereby incorporated by reference in its entirety.

TECHNICAL FIELD

The present application relates to a field of display technology, and particularly to a display panel and a display apparatus.

BACKGROUND

With a development of touch technology, more and more terminals are equipped with display panels with touch function. For the touch display panel, the electrostatic discharge will affect a normal operation of an electronic device, resulting in an abnormal touch operation of the touch display panel.

SUMMARY

Embodiments of the application provide a display panel and display apparatus.

In a first aspect, the embodiments of the present application provide a display panel including a display area and a non-display area located at least one side of the display area, wherein the non-display area includes a transfer area and a binding area, the transfer area is located at a side of the binding area close to the display area, and the transfer area includes: a first transfer unit electrically connected with a first ground line in the display area; and a second transfer unit electrically connected with a first touch signal line in the display area, wherein the binding area includes a first binding pad and a second binding pad, and the first binding pad and the second binding pad are configured to connect with a flexible circuit board or a drive chip, wherein the first transfer unit and the first binding pad are electrically connected through a second ground line located in the non-display area, and the second transfer unit and the second binding pad are electrically connected through a second touch signal line located in the non-display area, and wherein an impedance of the second ground line is smaller than an impedance of the second touch signal line.

In a second aspect, the embodiments of the present application provide a display apparatus including a display panel, wherein the display panel includes a display area and a non-display area located at least one side of the display area, wherein the non-display area includes a transfer area and a binding area, the transfer area is located at a side of the binding area close to the display area, and the transfer area includes: a first transfer unit electrically connected with a first ground line in the display area; and a second transfer unit electrically connected with a first touch signal line in the display area, wherein the binding area includes a first binding pad and a second binding pad, and the first binding pad and the second binding pad are configured to connect with a flexible circuit board or a drive chip, wherein the first transfer unit and the first binding pad are electrically connected through a second ground line located in the non-display area, and the second transfer unit and the second binding pad are electrically connected through a second touch signal line located in the non-display area, and wherein an impedance of the second ground line is smaller than an impedance of the second touch signal line.

BRIEF DESCRIPTION OF THE DRAWINGS

In order to explain the technical solutions of the embodiments of the present application more clearly, the following briefly introduces the drawings that need to be used in the embodiments of the present application. For those ordinary skilled in the art, other drawings may further be obtained from these drawings without the exercise of inventive faculty.

DETAILED DESCRIPTION

Figure 1:
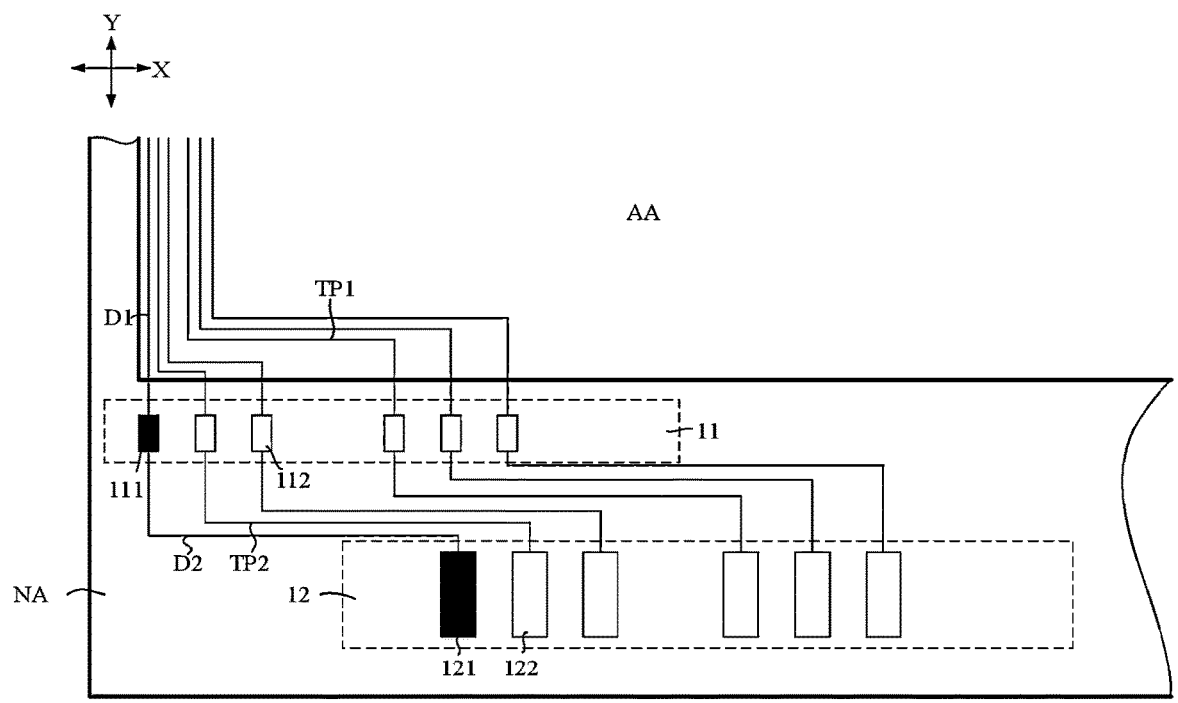
FIG. 1 is a schematic diagram of a partial structure of a display panel provided by the embodiments of the application.

The features and exemplary embodiments of various aspects of the present application will be described in detail below. In order to make the purpose, technical solutions and advantages of the present application more clear, the present application will be further described in detail below with reference to the accompanying drawings and specific embodiments. It should be understood that the specific embodiments described herein are only configured to explain the present application, and are not configured to limit the present application. It will be apparent to those skilled in the art that the present application may be practiced without some of these specific details. The following description of the embodiments is merely to provide a better understanding of the present application by illustrating examples of the present application.

It should be noted that, relational terms such as first and second herein are used only to distinguish one entity or operation from another entity or operation, and do not necessarily require or imply that any such relationship or sequence actually exists among these entities or operations. In addition, the terms "include", "comprise" or any other variation thereof are intended to encompass non-exclusive inclusion, such that a process, method, article or device which includes a list of elements includes not only those elements, but also other elements which are not explicitly listed or elements inherent to such process, method, article or device. Without further limitation, an element defined by the phrase "include" does not preclude the presence of additional identical elements in the process, method, article, or device that includes the element.

It should be understood that the term "and/or" used in this document is only to describe an association relationship of associated objects, which indicates that there may be three kinds of relationships. For example, A and/or B may indicate three cases of A existing alone, A and B existing at the same time, and B existing alone. In addition, the character "/" herein generally indicates that related objects have an "or" relationship.

It should be noted that, in the embodiments of the present application, the embodiments take a transistor being a P-type transistor as an example for illustration, but the transistor is not limited to a P-type transistor, and it may be a N-type transistor instead. For an N-type transistor, a turn-on level is a high level, and a turn-off level is a low level. That is, when a gate of the N-type transistor is at a high level, a connection between a first electrode and a second electrode thereof is turned on, and when the gate of the N-type transistor is at a low level, the connection between the first electrode and the second electrode thereof is turned off. For a P-type transistor, a turn-on level is a low level, and a turn-off level is a high level. That is, when a control electrode of the P-type transistor is at a low level, a connection between a first electrode and a second electrode thereof is turned on, and when the control electrode of the P-type transistor is at a high level, the connection between the first electrode and the second electrode thereof is turned off. In specific implementations, the gate of each transistor is used as a control electrode, and the first electrode of the transistor may be a source and the second electrode may be a drain, or the first electrode of the transistor may be the drain and the second electrode may be the source, dependent on a signal applied on the gate and its type, which will not be distinguished herein. In addition, both of the turn-on level and the turn-off level in the embodiments of the present application have a general meaning, and the on-level refers to any level that may make the transistor turn on, and the turn-off level refers to any level that may make the transistor turn off.

In the embodiments of the present application, the term "electrical connection" may refer to a direct electrical connection between two components, or may refer to an electrical connection between the two components via one or more other components.

In the embodiments of the present application, a first node is only defined for the convenience of describing a circuit structure, and the first node is not an actual circuit unit.

It will be apparent to those skilled in the art that various modifications and variations may be made in the present application without departing from the spirit or scope of the present application. Thus, the present application is intended to cover the modifications and variations of the present application that fall within the scope of the corresponding claims (claimed technical solutions) and their equivalents. It should be noted that the implementation manners provided by the embodiments of the present application may be combined with one another if there is no contradiction.

Before describing the technical solutions provided by the embodiments of the present application, in order to facilitate the understanding of the embodiments of the present application, the present application specifically describes the problems existed in the prior art first.

A display panel will generate static electricity during production or operation. If the static electricity enters into a touch signal line and/or a touch electrode, it may cause damage to the touch signal line and/or the touch electrode, resulting in abnormal touch operation of the display panel.

In order to solve the technical problem that the touch signal line and/or the touch electrode are easily damaged by the static electricity, the embodiments of the application provide a display panel and a display apparatus.

The technical concept of the embodiments of the application is to make an impedance of a second ground line between a first transfer unit and a first binding pad smaller than an impedance of a second touch signal line between a second transfer unit and a second binding pad. Since the impedance of the second ground line is smaller than the impedance of the second touch signal line, the static electricity will be released preferentially through a routing where the second ground line with relatively smaller impedance is located. Therefore, the affection of the static electricity on the touch signal line and its connected touch electrode is reduced, and the electrostatic protection capability of the display panel is improved.

Hereafter, the display panel provided by the embodiments of the application will be introduced first.

FIG. 1 is a schematic diagram of a partial structure of a display panel provided by the embodiments of the application. As shown in FIG. 1, the display panel 10 may include a display area AA and a non-display area NA located at least one side of the display area AA. The non-display area NA may include a transfer area 11 and a binding area 12. In a second direction Y, the transfer area 11 may be located on a side of the binding area 12 close to the display area AA. The second direction Y intersects with a first direction X. As an example, the second direction Y may be a column direction of the display panel 10, and the first direction X may be a row direction of the display panel 10. It should be noted that the transfer area 11 and the binding area 12 are only defined for the convenience of describing the structure of the display panel 10. The transfer area 11 may be understood as an area where the transfer unit is located, and the binding area 12 may be understood as an area where the binding pad is located.

The transfer area 11 may include a first transfer unit 111 and a second transfer unit 112. The first transfer unit 111 may be electrically connected with a first ground line D1 in the display area AA. The second transfer unit 112 is electrically connected with a first touch signal line TP1 in the display area AA. That is, the first transfer unit 111 may be a grounded transfer unit, and the second transfer unit 112 may be a touch transfer unit. In some examples, the first transfer unit 111 may specifically include a transfer pad or a transfer hole. Similarly, the second transfer unit 112 may also include a transfer pad or a transfer hole.

The binding area 12 may include a first binding pad 121 and a second binding pad 122. The first binding pad 121 and the second binding pad 122 may be configured to connect a flexible printed circuit (FPC) or a drive chip.

The first transfer unit 111 and the first binding pad 121 are electrically connected through a second ground line D2 located in the non-display area NA, and the second transfer unit 112 and the second binding pad 122 are electrically connected through a second touch signal line TP2 located in the non-display area NA. An impedance of the second ground line D2 may be smaller than an impedance of the second touch signal line TP2.

As shown in FIG. 1, in some examples, the transfer area 11 may include a plurality of second transfer units 112, the binding area 12 may include a plurality of second binding pads 122, and the plurality of second transfer units 112 and the plurality of second binding pads 122 may be electrically connected through a plurality of second touch signal lines TP2. For example, the plurality of second touch signal lines TP2 may have a same cross-sectional area and different lengths, such that the impedances of the plurality of second touch signal lines TP2 may be different. The impedance of the second ground line D2 may be smaller than an impedance of each of the second touch signal lines TP2. For example, the impedance of the second ground line D2 may be smaller than an impedance of a second touch signal line TP2 with a longest length.

Since the impedance of the second ground line D2 is smaller than the impedance of the second touch signal line TP2, the static electricity in the display panel will be released preferentially through the routing where the second ground line D2 with relatively smaller impedance is located. Therefore, the affection of the static electricity on the touch signal line and its connected touch electrode is reduced, and the electrostatic protection capability of the display panel is improved.

Figure 2:
FIG. 2 is a schematic diagram for size comparison between a first transfer unit and a second transfer unit in a display panel provided by the embodiments of the present application.
Figure 2:
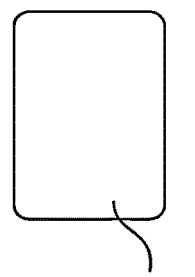

FIG. 2 is a schematic diagram for size comparison between a first transfer unit and a second transfer unit in a display panel provided by the embodiments of the present application. As shown in FIG. 2, according to some embodiments of the present application, a size of the first transfer unit 111 may be larger than a size of the second transfer unit 112. For example, a length of the first transfer unit 111 in the first direction X may be greater than a length of the second transfer unit 112 in the first direction X, and/or a length of the first transfer unit 111 in the second direction Y may be greater than a length of the second transfer unit 112 in the second direction Y. FIG. 2 shows the first transfer unit 111 and the second transfer unit 112 being the transfer pads as an example. It can be understood that when the first transfer unit 111 and the second transfer unit 112 are the transfer holes (vias), the size of the first transfer unit 111 may also be larger than the size of the second transfer unit 112.

In this way, since the size of the first transfer unit 111 is larger than the size of the second transfer unit 112, that is, a conductive area (a cross-sectional area) of the first transfer unit 111 is larger than a conductive area of the second transfer unit 112, the impedance of the first transfer unit 111 is smaller than the impedance of the second transfer unit 112, which may result in that the static electricity may be preferentially introduced into the first transfer unit 111 with smaller impedance, which further avoids the affection of the static electricity on the touch electrode and touch signal line.

Figure 3:
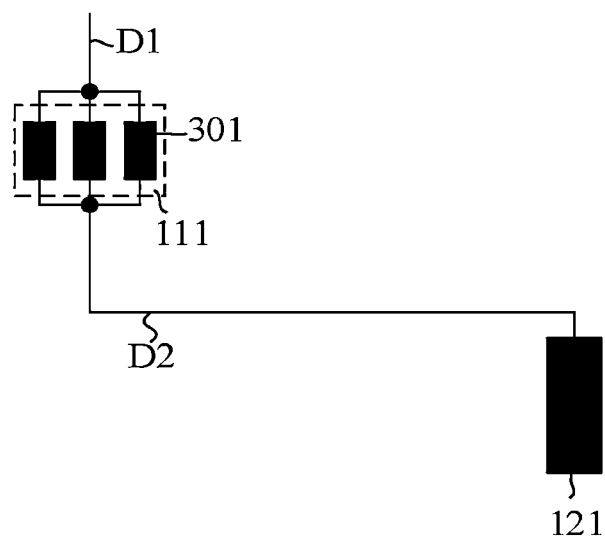
FIG. 3 is a schematic diagram of a partial structure of a display panel provided by the embodiments of the application.

FIG. 3 is a schematic diagram of a partial structure of a display panel provided by the embodiments of the application. As shown in FIG. 3, according to some embodiments of the present application, alternatively, the first transfer unit 111 may include a plurality of sub-transfer units 301 arranged to be spaced apart from one another. The embodiments of the present application do not limit the number of the sub-transfer units 301. The plurality of sub-transfer units 301 of a first transfer unit 111 are connected in parallel to be electrically connected with the first binding pad 121 through at least one second ground line D2. FIG. 3 shows the first transfer unit 111 including three sub-transfer units 301 as an example, but it can be understood that the first transfer unit 111 may also include other number of sub-transfer units 301.

In this way, by arranging the first transfer unit 111 as a plurality of sub-transfer units 301, the static electricity may be dispersed through the plurality of sub-transfer units 301, and the electrostatic protection capability may be further improved.

Figure 4:
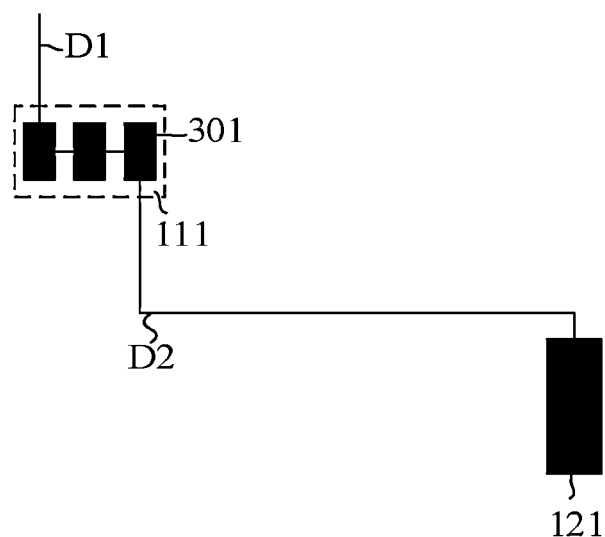
FIG. 4 is another schematic diagram of a partial structure of a display panel provided by the embodiments of the application.

FIG. 4 is another schematic diagram of a partial structure of a display panel provided by the embodiments of the application. As shown in FIG. 4, the difference from the embodiments shown in FIG. 3 lies in that: according to other embodiments of the application, alternatively, the plurality of sub-transfer units 301 in a first transfer unit 111 may be connected in series to be electrically connected with the first binding pad 121 through at least one second ground line D2.

In this way, by arranging the first transfer unit 111 as a plurality of sub-transfer units 301, the static electricity may be dispersed through the plurality of sub-transfer units 301, and the electrostatic protection capability may be further improved.

According to some embodiments of the application, alternatively, a cross-sectional area of the second ground line D2 may be larger than a cross-sectional area of the second touch signal line TP2. For example, in some specific examples, a thickness of the second ground line D2 may be the same as a thickness of the second touch signal line TP2, but a line width of the second ground line D2 may be greater than a line width of the second touch signal line TP2. In other specific examples, the line width of the second ground line D2 may be the same as the line width of the second touch signal line TP2, but the thickness of the second ground line D2 may be greater than the thickness of the second touch signal line TP2. In other specific examples, the line width of the second ground line D2 may be greater than the line width of the second touch signal line TP2, and the thickness of the second ground line D2 may be greater than the thickness of the second touch signal line TP2.

In this way, by making the cross-sectional area of the second ground line D2 larger than the cross-sectional area of the second touch signal line TP2, the impedance of the second ground line D2 may be smaller than the impedance of the second touch signal line TP2, such that the static electricity in the display panel will be released preferentially through the routing where the second ground line D2 with relatively smaller impedance is located Therefore, the affection of the static electricity on the touch signal line and its connected touch electrode is reduced, and the electrostatic protection capability of the display panel is improved.

Figure 5:
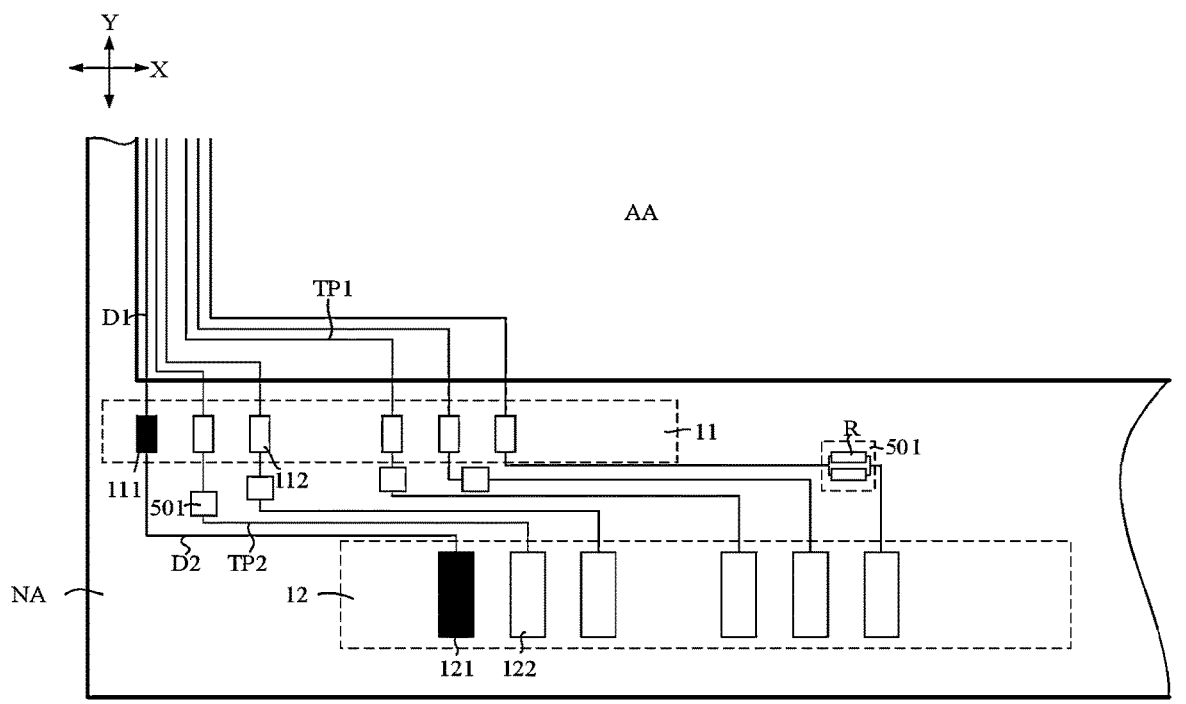
FIG. 5 is yet another schematic diagram of a partial structure of a display panel provided by the embodiments of the application.

FIG. 5 is yet another schematic diagram of a partial structure of a display panel provided by the embodiments of the application. As shown in FIG. 5, according to some embodiments of the application, alternatively, the display panel 10 may further include an impedance unit 501, which may be connected in series with the second touch signal line TP2. Resistance values of the impedance units 501 connected with different second touch signal lines TP2 may be the same or different from one another. For example, in some examples, for any two second touch signal lines TP2 (a $i^{th}$ second touch signal line TP2 and a $(i+1)^{th}$ second touch signal line TP2), a length of the $i^{th}$ second touch signal line TP2 may be smaller than a length of the $(i+1)^{th}$ second touch signal line TP2, and the resistance value of the impedance unit 501 connected to the $i^{th}$ second touch signal line TP2 may be greater than the resistance value of the impedance unit 501 connected to the $(i+1)^{th}$ second touch signal line TP2. In this way, the impedance of the $i^{th}$ second touch signal line TP2 is the same or similar to the impedance of the $(i+1)^{th}$ second touch signal line TP2, which reduces an impedance difference among different second touch signal lines TP2, and improves an uniformity of touch.

In this way, by connecting the impedance unit 501 with the second touch signal line TP2 in series, the impedance of the second touch signal line TP2 may be increased, such that the impedance of the second ground line D2 is smaller than the impedance of the second touch signal line TP2 Therefore, the affection of the static electricity on the touch signal line and its connected touch electrode is reduced, and the electrostatic protection capability of the display panel is improved.

In some embodiments, the impedance unit 501 includes, but is not limited to, a resistor.

Referring to FIG. 5, in some specific examples, alternatively, the impedance unit 501 may include at least two resistors R connected in parallel. That is, a second touch signal line TP2 may be electrically connected with at least two resistors R connected in parallel.

In this way, on one hand, the second touch signal line TP2 is electrically connected with at least two resistors connected in parallel, and when the static electricity is transmitted to the second touch signal line TP2, the at least two resistors connected in parallel may have a function of voltage-divide to reduce the affection of the static electricity on the touch electrode and touch signal line. On the other hand, the impedance of the second touch signal line TP2 may be increased, so that the static electricity may be preferentially introduced into the second ground line D2 with smaller impedance, which further avoids the affection of the static electricity on the touch electrode and touch signal line.

Figure 6:
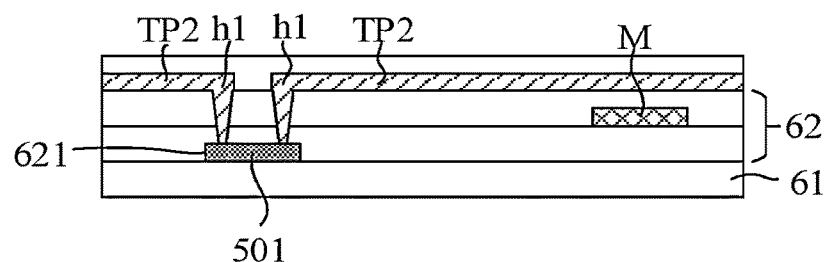
FIG. 6 is a schematic cross-section view of a display panel provided by the embodiments of the present application.

FIG. 6 is a schematic cross-section view of a display panel provided by the embodiments of the present application. As shown in FIG. 6, according to some embodiments of the present application, alternatively, the display panel 10 may include a first substrate 61 and a drive device layer 62 stacked with each other. The drive device layer 62 may include an active layer 621 and at least one metal layer M. The impedance unit 501 may be located in the active layer 621 or the metal layer M, and the second touch signal line TP2 may be electrically connected with the impedance unit 501 through a first via h1. FIG. 6 shows that the impedance unit 501 is located in the active layer 621.

Since a material of the active layer 621 is a semiconductor material and an impedance of the semiconductor material is large, when the impedance unit 501 is prepared from the semiconductor material in the active layer 621, the impedance of the impedance unit 501 is larger than others formed with a same volume, and a volume of the impedance unit 501 is smaller than others formed with a same impedance. Thus, the impedance of the second touch signal line TP2 may be significantly increased or the volume of the impedance unit 501 may be reduced.

Figure 7:
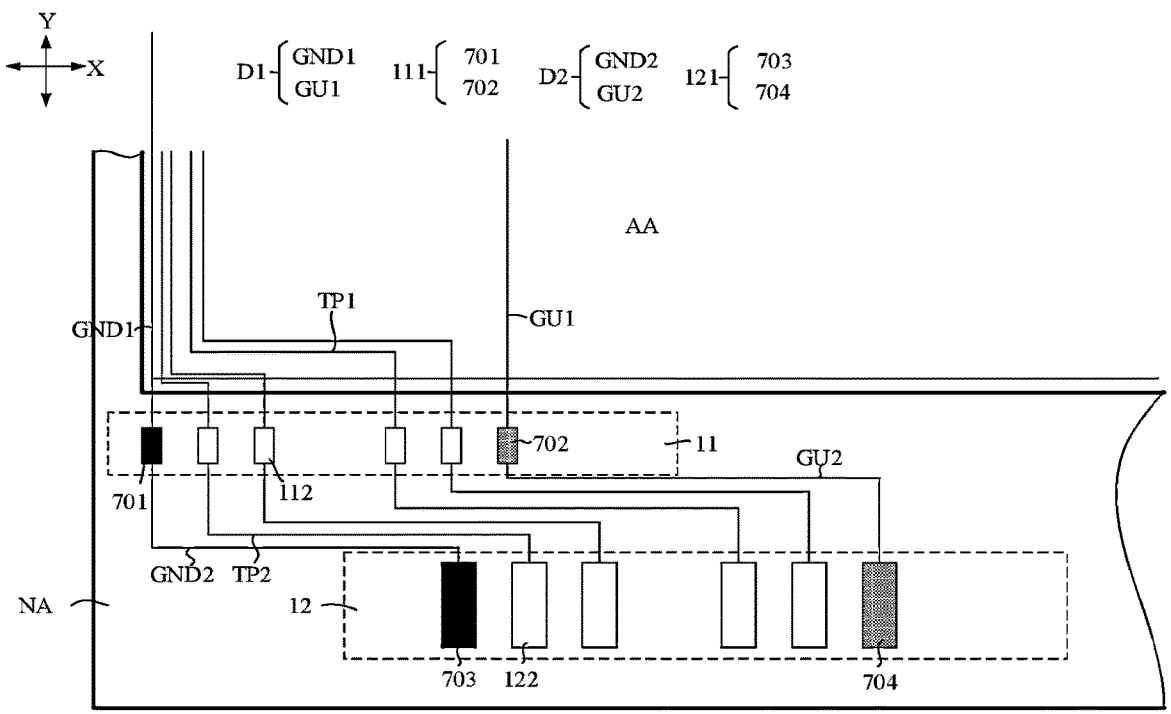
FIG. 7 is another schematic diagram of a structure of a display panel provided by the embodiments of the application.

FIG. 7 is another schematic diagram of a structure of a display panel provided by the embodiments of the application. As shown in FIG. 7, according to some embodiments of the application, alternatively, the first ground line D1 may include a first sub-ground line GND1 and a second sub-ground line GU1. In some examples, for example, at least part of the first sub-ground line GND1 may be arranged around the display area AA, and the first sub-ground line GND1 may have a function of shielding. For example, the second sub-ground line GU1 may be arranged between two signal lines, and the second sub-ground line GU1 may have of function of preventing signal crosstalk.

The first transfer unit 111 may include a first sub-transfer unit 701 and a second sub-transfer unit 702. The first sub-transfer unit 701 may be electrically connected with the first sub-ground line GND1, and the second sub-transfer unit 702 may be electrically connected with the second sub-ground line GU1.

The first bound pad 121 may include a first sub-bound pad 703 and a second sub-bound pad 704. The second ground line D2 may include a third sub-ground line GND2 and a fourth sub-ground line GU2. The first sub-transfer unit 701 and the first sub-binding pad 703 may be electrically connected through the third sub-ground line GND2 located in the non-display area NA, and the second sub-transfer unit 702 and the second sub-binding pad 704 may be electrically connected through the fourth sub-ground line GU2 located in the non-display area NA.

An impedance of the third sub-ground line GND2 may be smaller than or equal to an impedance of the fourth sub-ground line GU2, and the impedance of the fourth sub-ground line GU2 may be smaller than the impedance of the second touch signal line TP2.

As shown in FIG. 7, in some examples, the transfer area 11 may include a plurality of second transfer units 112, the binding area 12 may include a plurality of second binding pads 122, and the plurality of second transfer units 112 and the plurality of second binding pads 122 may be electrically connected through a plurality of second touch signal lines TP2. For example, the plurality of second touch signal lines TP2 may have a same cross-sectional area and different lengths, such that the impedances of the plurality of second touch signal lines TP2 may be different. In the second direction X, the first sub-transfer unit 701, the plurality of second transfer units 112 and the second sub-transfer unit 702 may be arranged successively, the first sub-transfer unit 701 may be close to the edge of the display panel, the second sub-transfer unit 702 may be close to the center line of the display panel, and the plurality of second transfer units 112 may be located between the first sub-transfer unit 701 and the second sub-transfer unit 702.

An impedance of the third sub-ground line GND2 may be smaller than or equal to an impedance of the fourth sub-ground line GU2, and the impedance of the fourth sub-ground line GU2 may be smaller than the impedance of each second touch signal line TP2. For example, the impedance of the fourth sub-ground line GU2 may be smaller than the impedance of the second touch signal line TP2 with the longest length.

In this way, since each of the impedance of the third sub-ground line GND2 and the impedance of the fourth sub-ground line GU2 is smaller than the impedance of the second touch signal line TP2, the static electricity in the display panel will be released preferentially through the routing where the third sub-ground line GND2 and/or the fourth sub-ground line GU2 with relatively smaller impedance is located. Therefore, the affection of the static electricity on the touch signal line and its connected touch electrode is reduced, and the electrostatic protection capability of the display panel is improved.

In other embodiments, the impedance of the fourth sub-ground line GU2 may also be smaller than or equal to the impedance of the third sub-ground line GND2, and the impedance of the third sub-ground line GND2 may be smaller than the impedance of the second touch signal line TP2. That is, the impedance relationship between the third sub-ground line GND2 and the fourth sub-ground line GU2 may be reversed, which is not limited in the embodiments of the application.

Figure 8:
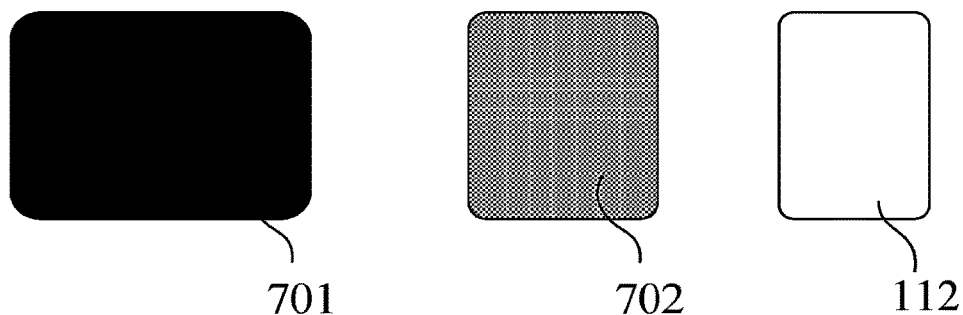
FIG. 8 is a schematic diagram for size comparison among a first sub-transfer unit, a second sub-transfer unit and the second transfer unit in a display panel provided by the embodiments of the present application.

FIG. 8 is a schematic diagram for size comparison among a first sub-transfer unit, a second sub-transfer unit and the second transfer unit in a display panel provided by the embodiments of the present application. As shown in FIG. 8, according to some embodiments of the present application, alternatively, a size of the first sub-transfer unit 701 may be greater than or equal to a size of the second sub-transfer unit 702, and the size of the second sub-transfer unit 702 may be greater than the size of the second transfer unit 112.

FIG. 8 shows the first sub-transfer unit 701, the second sub-transfer unit 702 and the second transfer unit 112 as the transfer pads as an example. It can be understood that when the first sub-transfer unit 701, the second sub-transfer unit 702 and the second transfer unit 112 are transfer holes (vias), the size of the first sub-transfer unit 701 may also be greater than or equal to the size of the second sub-transfer unit 702, and the size of the second sub-transfer unit 702 may also be greater than the size of the second transfer unit 112.

In this way, since each of the size of the first sub-transfer unit 701 and the size of the second sub-transfer unit 702 is greater than the size of the second transfer unit 112, that is, each of a conductive area (a cross-sectional area) of the first sub-transfer unit 701 and a conductive area of the second sub-transfer unit 702 is larger than the conductive area of the second transfer unit 112, each of an impedance of the first sub-transfer unit 701 and an second sub-transfer unit 702 is smaller than the impedance of the second transfer unit 112, and the static electricity may be preferentially introduced into the first sub-transfer unit 701 and/or the second sub-transfer unit 702 with smaller impedance, which further avoids the affection of the static electricity on the touch electrode and touch signal line.

In other embodiments, the size relationship between the first sub-transfer unit 701 and the second sub-transfer unit 702 may be reversed. That is, the size of the second sub-transfer unit 702 may be greater than or equal to the size of the first sub-transfer unit 701, and the size of the first sub-transfer unit 701 may be greater than the size of the second transfer unit 112.

According to some embodiments of the application, alternatively, a cross-sectional area of the third sub-ground line GND2 may be greater than a cross-sectional area of the fourth sub-ground line GU2, and the cross-sectional area of the fourth sub-ground line GU2 may be greater than the cross-sectional area of the second touch signal line TP2.

For example, in some specific examples, each of a thickness of the third sub-ground line GND2 and a thickness of the fourth sub-ground line GU2 may be the same as the thickness of the second touch signal line TP2, but each of a line width of the third sub-ground line GND2 and a line width of the fourth sub-ground line GU2 may be greater than the line width of the second touch signal line TP2. In other specific examples, each of the line width of the third sub-ground line GND2 and the line width of the fourth sub-ground line GU2 may be the same as the line width of the second touch signal line TP2, but each of the thickness of the third sub-ground line GND2 and the thickness of the fourth sub-ground line GU2 may be greater than the thickness of the second touch signal line TP2. In other specific examples, each of the line width of the third sub-ground line GND2 and the line width of the fourth sub-ground line GU2 may be greater than the line width of the second touch signal line TP2, and each of the thickness of the third sub-ground line GND2 and the thickness of the fourth sub-ground line GU2 may be greater than the thickness of the second touch signal line TP2.

In this way, by making each of the cross-sectional area of the third sub-ground line GND2 and the cross-sectional area of the fourth sub-ground line GU2 greater than the cross-sectional area of the second touch signal line TP2, each of the impedance of the third sub-ground line GND2 and the impedance of the fourth sub-ground line GU2 may be smaller than the impedance of the second touch signal line TP2. Therefore, the static electricity in the display panel will be released preferentially through the routing where the third sub-ground line GND2 and/or the fourth sub-ground line GU2 with relatively smaller impedance is located. Therefore, the affection of the static electricity on the touch signal line and its connected touch electrode is reduced, and the electrostatic protection capability of the display panel is improved.

Figure 9:
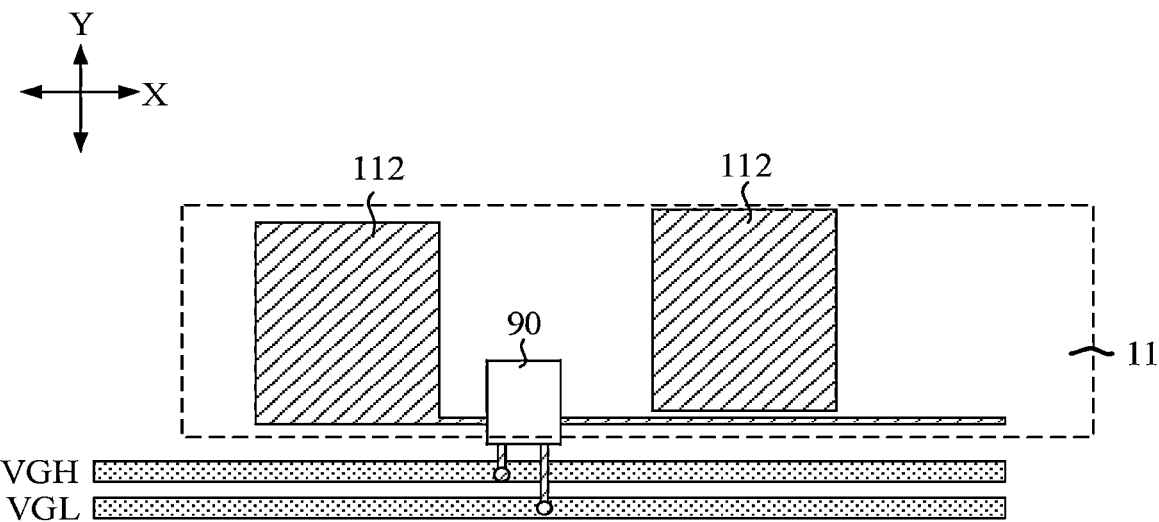
FIG. 9 is yet another schematic diagram of a partial structure of a display panel provided by the embodiments of the application.

FIG. 9 is yet another schematic diagram of a partial structure of a display panel provided by the embodiments of the application. As shown in FIG. 9, according to some embodiments of the present application, alternatively, the display panel 10 may further include an electrostatic protection circuit 90, a first power supply voltage signal line VGH and a second power supply voltage signal line VGL. The electrostatic protection circuit 90 may be electrically connected with the second transfer unit 112, the first power supply voltage signal line VGH and the second power supply voltage signal line VGL. The electrostatic protection circuit 90 may be configured to transmit static electricity on the second transfer unit 112 to at least one of the first power supply voltage signal line VGH and the second power supply voltage signal line VGL. For example, when the static electricity on the second transfer unit 112 is positive, it may be transmitted to the first power supply voltage signal line VGH for electrostatic discharge. For example, when the static electricity on the second transfer unit 112 is negative, it may be transmitted to the second power supply voltage signal line VGL for electrostatic discharge.

In this way, by connecting the second transfer unit 112 with the electrostatic protection circuit 90, the static electricity on the second transfer unit 112 may be transmitted to at least one of the first power supply voltage signal line VGH and the second power supply voltage signal line VGL, which further avoids the affection of the static electricity on the touch electrode and touch signal line, and improves the electrostatic protection capability of the display panel.

Figure 10:
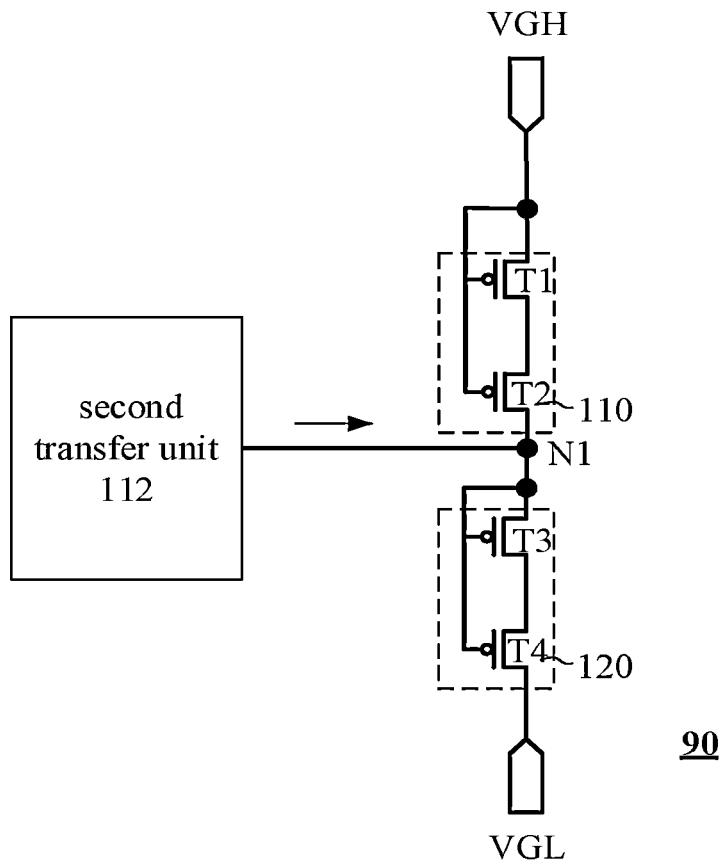
FIG. 10 is a schematic diagram of a circuit of an electrostatic protection circuit in a display panel provided by the embodiments of the application.

FIG. 10 is a schematic diagram of a circuit of an electrostatic protection circuit in a display panel provided by the embodiments of the application. As shown in FIG. 10, according to some embodiments of the present application, alternatively, the electrostatic protection circuit 90 may include a first switch unit 110 and a second switch unit 120.

Each of a control terminal of the first switch unit 110 and a first terminal of the first switch unit 110 may be electrically connected with the first power supply voltage signal line VGH, and a second terminal of the first switch unit 110 may be electrically connected with the second transfer unit 112.

Each of a control terminal of the second switch unit 120 and a first terminal of the second switch unit 120 may be electrically connected with the second transfer unit 112, and a second terminal of the second switch unit 120 is electrically connected with the second power supply voltage signal line VGL.

When a static electricity discharge phenomena occurs in the display panel, the static electricity reaches a first node N1. If a potential of the first node N1 is higher than a potential of the first power supply voltage signal line VGH, the first switch unit 110 is turned on, the second switch unit 120 is turned off, and the static electricity is transmitted to the first power supply voltage signal line VGH through the first switch unit 110 which is turned on, and thus a function for static electricity discharge and protecting the routing where the second transfer unit 112 is located is realized.

When the static electricity discharge phenomena occurs on the display panel, the static electricity reaches the first node N1. If the potential of the first node N1 is lower than a potential of the second power supply voltage signal line VGL, the first switch unit 110 is turned off, the second switch unit 120 is turned on, and the static electricity is transmitted to the second power supply voltage signal line VGL through the second switch unit 120 which is turned on, and thus the function for static electricity discharge and protecting the routing where the second transfer unit 112 is located is realized.

Referring to FIG. 10, in some specific embodiments, alternatively, the first switch unit 110 may include a first transistor T1 and a second transistor T2, and the second switch unit 120 may include a third transistor T3 and a fourth transistor T4.

Each of a gate of the first transistor T1 and a first electrode of the first transistor T1 may be electrically connected with the first power supply voltage signal line VGH.

A gate of the second transistor T2 is electrically connected with the first power supply voltage signal line VGH, a first electrode of the second transistor T2 is electrically connected with a second electrode of the first transistor T1, and a second electrode of the second transistor T2 is electrically connected with the second transfer unit 112.

Each of a gate of the third transistor T3 and a first electrode of the third transistor T3 may be electrically connected with the second transfer unit 112.

A gate of the fourth transistor T4 is electrically connected with the second transfer unit 112, a first electrode of the fourth transistor T4 is electrically connected with a second electrode of the third transistor T3, and a second electrode of the fourth transistor T4 is electrically connected with the second power supply voltage signal line VGL.

When the static electricity discharge phenomena occurs on the display panel, the static electricity reaches the first node N1. If the potential of the first node N1 is higher than the potential of the first power supply voltage signal line VGH, the first transistor T1 and the second transistor T2 are turned on, the third transistor T3 and the fourth transistor T4 are turned off, and the static electricity is transmitted to the first power supply voltage signal line VGH through the first transistor T1 and the second transistor T2 which are turned on, and thus the function for static electricity discharge and protecting the routing where the second transfer unit 112 is located is realized.

When the static electricity discharge phenomena occurs on the display panel, the static electricity reaches the first node N1. If the potential of the first node N1 is lower than the potential of the second power supply voltage signal line VGL, the first transistor T1 and the second transistor T2 are turned off, the third transistor T3 and the fourth transistor T4 are turned on, and the static electricity is transmitted to the second power supply voltage signal line VGL through the third transistor T3 and the fourth transistor T4 which are turned on, and thus the function for static electricity discharge and protecting the routing where the second transfer unit 112 is located is realized.

In some examples, each of the first transistor T1, the second transistor T2, the third transistor T3 and the fourth transistor T4 may be a P-type transistor.

Figure 11:
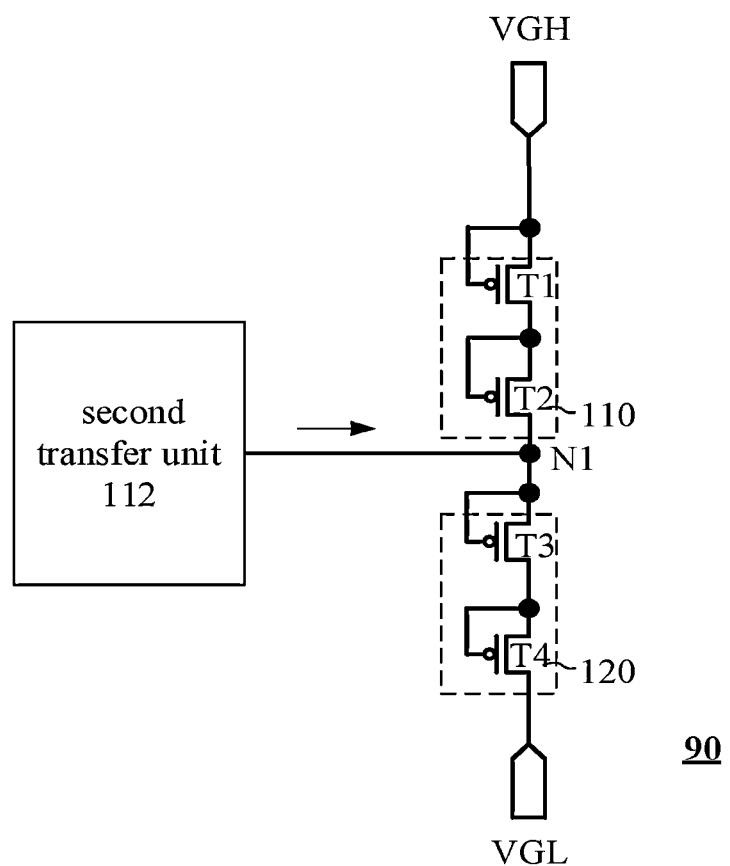
FIG. 11 is another schematic diagram of a circuit of an electrostatic protection circuit in a display panel provided by the embodiments of the application.

FIG. 11 is another schematic diagram of a circuit of an electrostatic protection circuit in a display panel provided by the embodiments of the application. As shown in FIG. 11, according to other embodiments of the present application, alternatively, the electrostatic protection circuit 90 may include a first transistor T1, a second transistor T2, a third transistor T3 and a fourth transistor T4.

A gate of the first transistor T1 is electrically connected with the first power supply voltage signal line VGH, and a first electrode of the first transistor T1 is electrically connected with the first power supply voltage signal line VGH.

Each of a gate of the second transistor T2 and a first electrode of the second transistor T2 is electrically connected with a second electrode of the first transistor T1, and a second electrode of the second transistor T2 is electrically connected with the second transfer unit 112.

Each of a gate of the third transistor T3 and a first electrode of the third transistor T3 is electrically connected with the second transfer unit 112.

Each of a gate of the fourth transistor T4 and a first electrode of the fourth transistor T4 is electrically connected with a second electrode of the third transistor T3, and a second electrode of the fourth transistor T4 is electrically connected with the second power supply voltage signal line VGL.

When the static electricity discharge phenomena occurs on the display panel, the static electricity reaches the first node N1. If the potential of the first node N1 is higher than the potential of the first power supply voltage signal line VGH, the first transistor T1 and the second transistor T2 are turned on, the third transistor T3 and the fourth transistor T4 are turned off, and the static electricity is transmitted to the first power supply voltage signal line VGH through the first transistor T1 and the second transistor T2 which are turned on, and thus the function for static electricity discharge and protecting the routing where the second transfer unit 112 is located is realized.

When the static electricity discharge phenomena occurs on the display panel, the static electricity reaches the first node N1. If the potential of the first node N1 is lower than the potential of the second power supply voltage signal line VGL, the first transistor T1 and the second transistor T2 are turned off, the third transistor T3 and the fourth transistor T4 are turned on, and the static electricity is transmitted to the second power supply voltage signal line VGL through the third transistor T3 and the fourth transistor T4 which are turned on, and thus the function for static electricity discharge and protecting the routing where the second transfer unit 112 is located is realized.

In some examples, each of the first transistor T1, the second transistor T2, the third transistor T3 and the fourth transistor T4 may be a P-type transistor.

Referring back to FIG. 9, according to some embodiments of the present application, alternatively, the transfer area 11 may include a plurality of second transfer units 112 arranged to be spaced apart from one another in the first direction X. One second transfer unit 112 may be electrically connected with one first touch signal line TP1.

The electrostatic protection circuit 90 may be located in the transfer area 11, specifically between two adjacent second transfer units 112 in the first direction X.

In this way, by using the existed active layer and metal layer in the transfer area 11 to prepare the electrostatic protection circuit 90, a sufficient use of the materials and space may be realized, while a better electrostatic protection for the routing where the second transfer unit 112 is located is realized, which avoids the affection of the static electricity on the touch electrode and touch signal line, and improves the electrostatic protection capability of the display panel.

Figure 12:
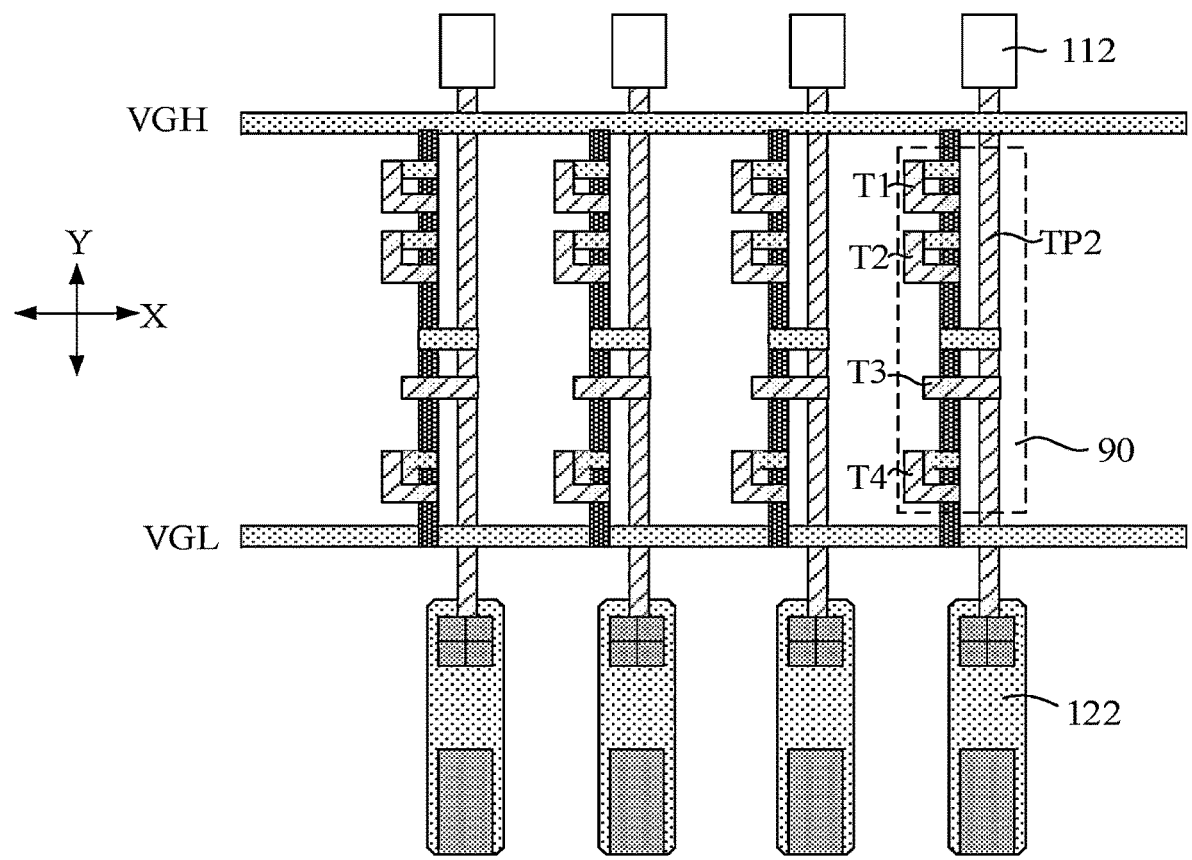
FIG. 12 is yet another schematic diagram of a partial structure of a display panel provided by the embodiments of the application.

FIG. 12 is yet another schematic diagram of a partial structure of a display panel provided by the embodiments of the application. As shown in FIG. 1 and FIG. 12, according to other embodiments of the present application, alternatively, the display area AA, the transfer area 11 and the binding area 12 may be arranged successively in the second direction Y. In the second direction Y, the electrostatic protection circuit 90 may be located between the second transfer unit 112 and the second binding pad 122, and the electrostatic protection circuit 90 may be electrically connected with the second touch signal line TP2. That is, in the second direction Y, the electrostatic protection circuit 90 may be located between the transfer area 11 and the binding area 12. In some examples, the first power supply voltage signal line VGH and the second power supply voltage signal line VGL may extend in the first direction X, and the second touch signal line TP2 may extend in the second direction Y. A plurality of electrostatic protection circuits 90 may be arranged successively in the first direction X, and are electrically connected with the first power supply voltage signal line VGH and the second power supply voltage signal line VGL. The first transistor T1, the second transistor T2, the third transistor T3 and the fourth transistor T4 of each electrostatic protection circuit 90 may be arranged successively in the first direction X.

In this way, by using the existed active layer and metal layer in the area between the transfer area 11 and the binding area 12 to prepare the electrostatic protection circuit 90, a sufficient use of the materials and space may be realized, while a better electrostatic protection for the routing where the second transfer unit 112 is located is realized, which avoids the affection of the static electricity on the touch electrode and touch signal line, and improves the electrostatic protection capability of the display panel.

According to some embodiments of the application, alternatively, the display panel 10 may be an In-Cell Touch Panel. The following will describe in detail the examples of a display panel 10 which is an In-Cell Touch Panel.

Figure 13:
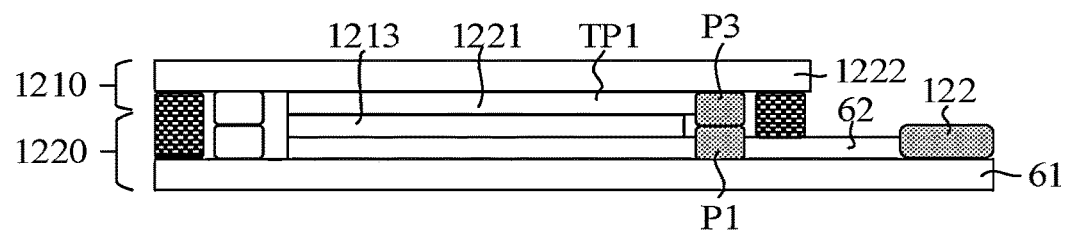
FIG. 13 is another schematic cross-section view of a display panel provided by the embodiments of the present application.

FIG. 13 is another schematic cross-section view of a display panel provided by the embodiments of the present application. As shown in FIG. 13, according to some embodiments of the present application, alternatively, the display panel 10 may include an array substrate 1210 and a packaging substrate 1220. The array substrate 1210 may include a first substrate 61, a drive device layer 62 and a light-emitting layer 1213 arranged to be stacked with one another. The packaging substrate 1220 may include a second substrate 1221 and a touch function layer 1222 arranged to be stacked with each other. The touch function layer 1222 may be located between the first substrate 61 and the second substrate 1221. The touch function layer 1222 may be arranged with the first touch signal line TP1 and the touch electrode.

Figure 14:
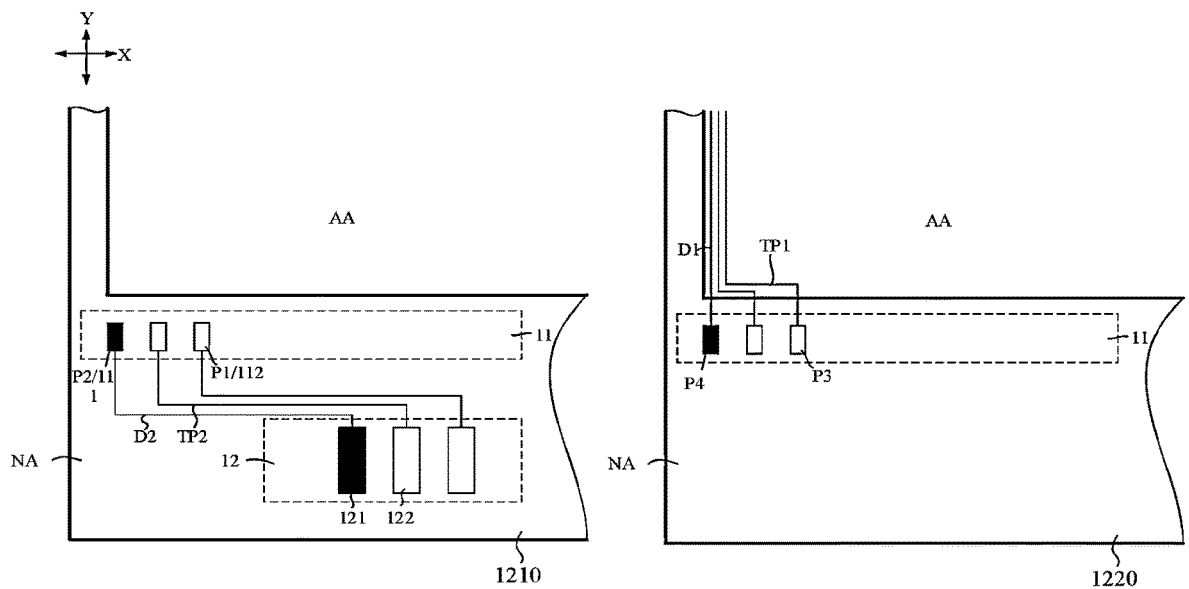
FIG. 14 is a schematic plane diagram of an array substrate and a packaging substrate in a display panel provided by the embodiments of the application.

FIG. 14 is a schematic plane diagram of an array substrate and a packaging substrate in a display panel provided by the embodiments of the application. As shown in FIG. 13 and FIG. 14, in the transfer area 11, the array substrate 1210 may be arranged with a first touch overlap pad P1 and a first ground overlap pad P2. The first touch overlap pad P1 may be electrically connected with the second touch signal line TP2, and the first ground overlap pad P2 is electrically connected with the second ground line D2. In the transfer area 11, the packaging substrate 1220 is arranged with a second touch overlap pad P3 and a second ground overlap pad P4. The second touch overlap pad P3 is electrically connected with the first touch signal line TP1, and the second touch overlap pad P3 is overlapped with the first touch overlap pad P1. The second ground overlap pad P4 is electrically connected with the first ground line D1, and the first ground overlap pad P2 may be overlapped with the second ground overlap pad P4. For example, the first transfer unit 111 may be the first ground overlap pad P2, and the second transfer unit 112 may be the first touch overlap pad P1.

The impedance of the second ground line D2 may be smaller than the impedance of the second touch signal line TP2. In this way, since the impedance of the second ground line D2 is smaller than the impedance of the second touch signal line TP2, the static electricity in the In-Cell Touch Panel will be released preferentially through the routing where the second ground line D2 with relatively smaller impedance is located. Therefore, the affection of the static electricity on the touch signal line and its connected touch electrode is reduced, and the electrostatic protection capability of the In-Cell Touch Panel is improved.

Figure 15:
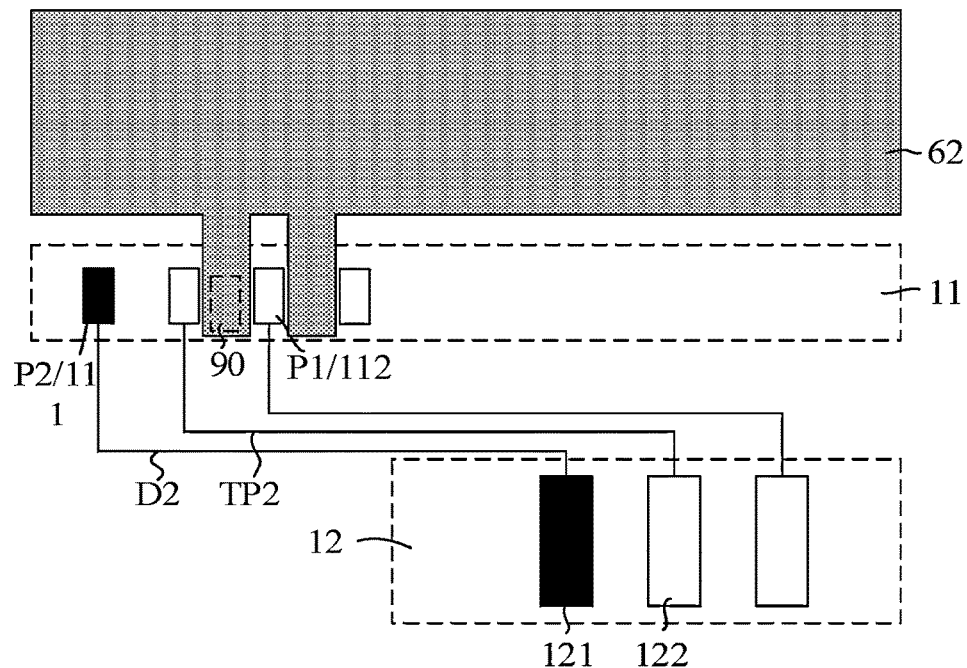
FIG. 15 is a schematic plane diagram of a part of an array substrate in a display panel provided by the embodiments of the application.

FIG. 15 is a schematic plane diagram of a part of an array substrate in a display panel provided by the embodiments of the application. As shown in FIG. 13 and FIG. 15, according to some embodiments of the present application, alternatively, the first touch overlap pad P1 may be located on a side of the first substrate 61 towards the second substrate 1221. The drive device layer 62 may extend into an area between two adjacent first touch overlap pads P1 located in the transfer area 11. That is, the drive device layer 62 may extend into the gap between any two adjacent first touch overlap pads P1. The electrostatic protection circuit 90 may be arranged in the drive device layer 62 between two adjacent first touch overlap pads P1.

In this way, by using the drive device layer 62 in the transfer area 11 to prepare the electrostatic protection circuit 90, a sufficient use of the materials and space may be realized, while a better electrostatic protection for the routing where the first touch overlap pad P1 is located is realized, which avoids the affection of the static electricity on the touch electrode and touch signal line, and improves the electrostatic protection capability of the In-Cell Touch Panel.

Figure 16:
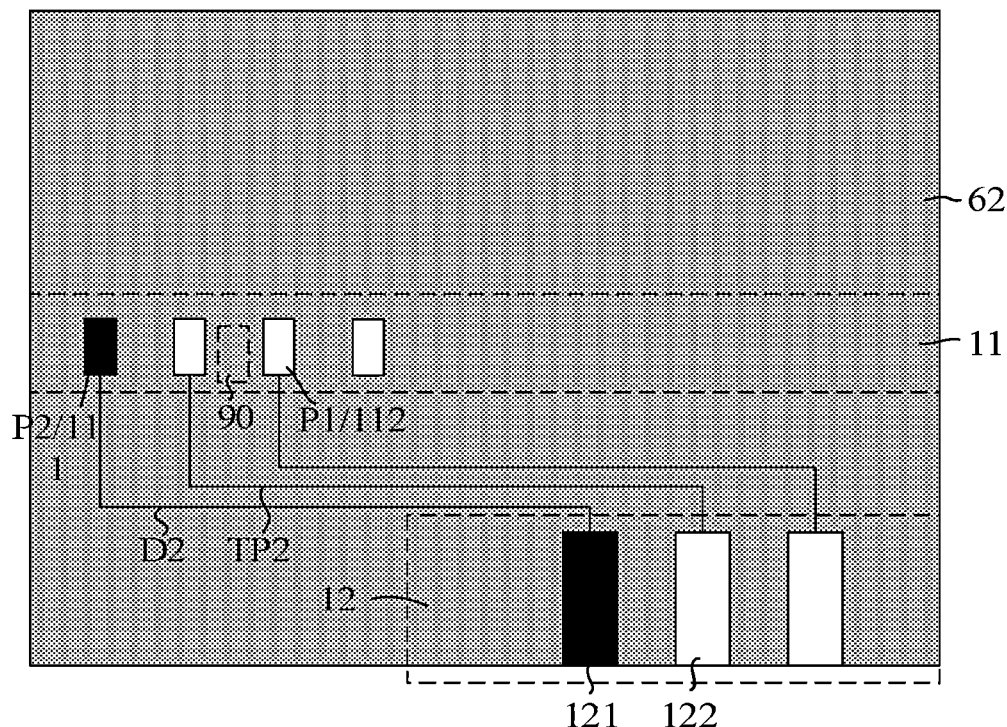
FIG. 16 is another schematic plane diagram of a part of an array substrate in a display panel provided by the embodiments of the application.
Figure 17:
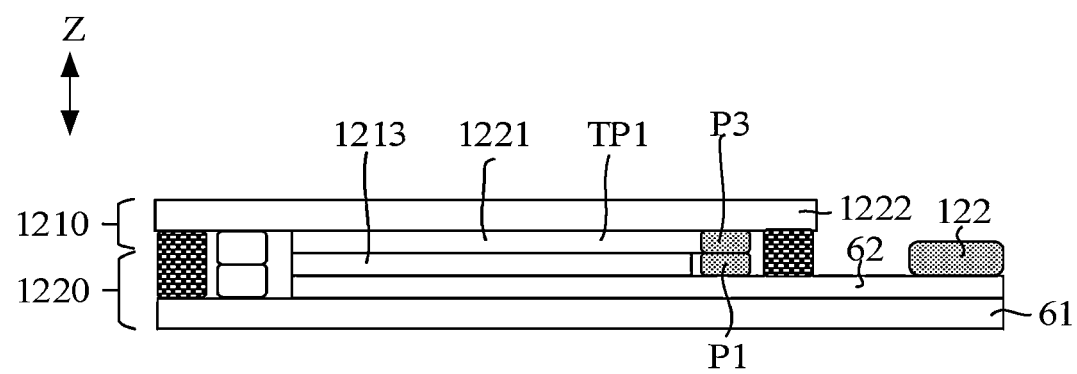
FIG. 17 is yet another schematic cross-section view of a display panel provided by the embodiments of the present application.

FIG. 16 is another schematic plane diagram of a part of an array substrate in a display panel provided by the embodiments of the application. FIG. 17 is yet another schematic cross-section view of a display panel provided by the embodiments of the present application. As shown in FIG. 16 and FIG. 17, according to other embodiments of the present application, alternatively, the drive device layer 62 may be extended into the transfer area 11. The first touch overlap pad P1 may be located on a side of the drive device layer 62 of the transfer area 11 which is away from the first substrate 61. That is, in a thickness direction Z of the display panel, the first touch overlap pad P1 may be located above the drive device layer 62. The electrostatic protection circuit 90 may be arranged in the drive device layer 62 located in the transfer area 11.

In this way, by using the drive device layer 62 in the transfer area 11 to prepare the electrostatic protection circuit 90, a sufficient use of the materials and space may be realized, while a better electrostatic protection for the routing where the first touch overlap pad P1 is located is realized, which avoids the affection of the static electricity on the touch electrode and touch signal line, and improves the electrostatic protection capability of the In-Cell Touch Panel.

Figure 18:
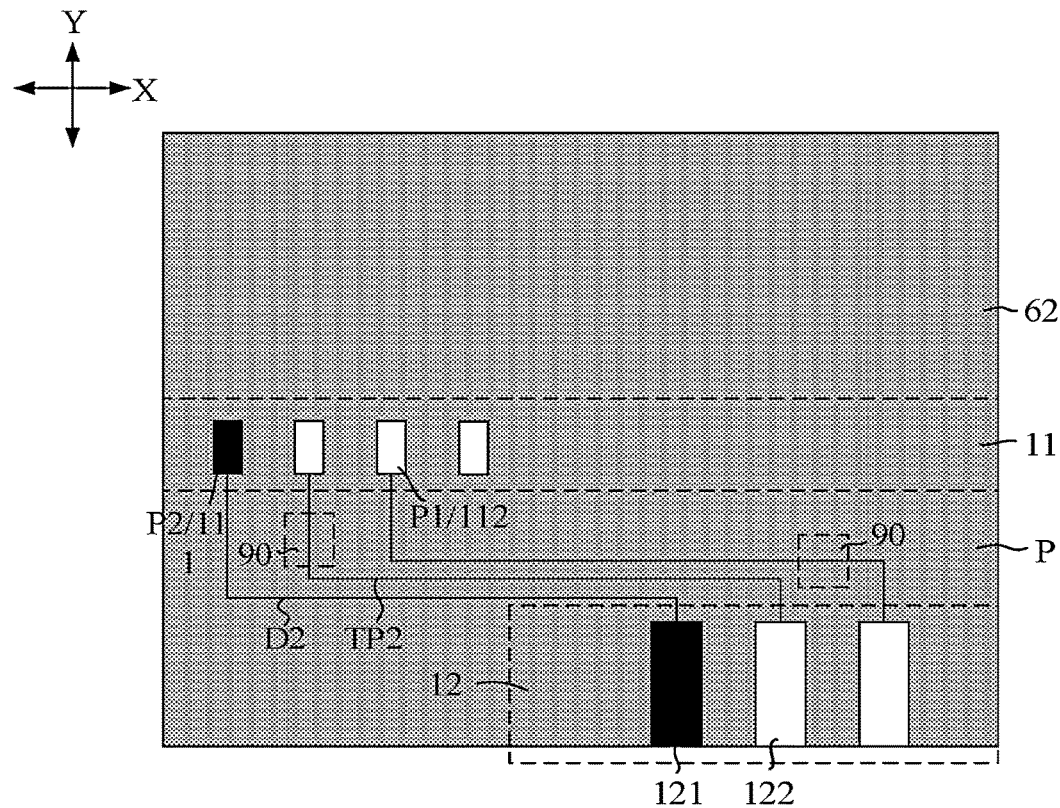
FIG. 18 is another schematic plane diagram of a part of an array substrate in a display panel provided by the embodiments of the application.

FIG. 18 is another schematic plane diagram of a part of an array substrate in a display panel provided by the embodiments of the application. According to other embodiments of the application, alternatively, in the second direction Y, a target area P between the first touch overlap pad P1 and the second binding pad 122 is arranged with the drive device layer 62, and the electrostatic protection circuit 90 may be arranged in the drive device layer 62 of the target area P.

In this way, by using the drive device layer 62 in the target area P between the transfer area 11 and the binding area 12 to prepare the electrostatic protection circuit 90, a sufficient use of the materials and space may be realized, while a better electrostatic protection for the routing where the first touch overlap pad P1 is located is realized, which avoids the affection of the static electricity on the touch electrode and touch signal line, and improves the electrostatic protection capability of the In-Cell Touch Panel.

According to some embodiments of the application, alternatively, the display panel 10 may employ a TPOP (TP on panel) structure, that is, the touch function layer may be formed above the packaging layer. The following will describe in detail the examples of a display panel 10 which is a TPOP display panel.

Figure 19:
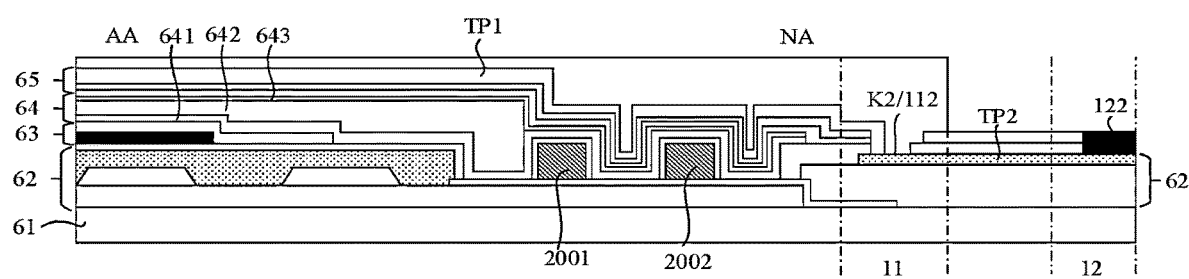
FIG. 19 is yet another schematic cross-section view of a display panel provided by the embodiments of the present application.
Figure 20:
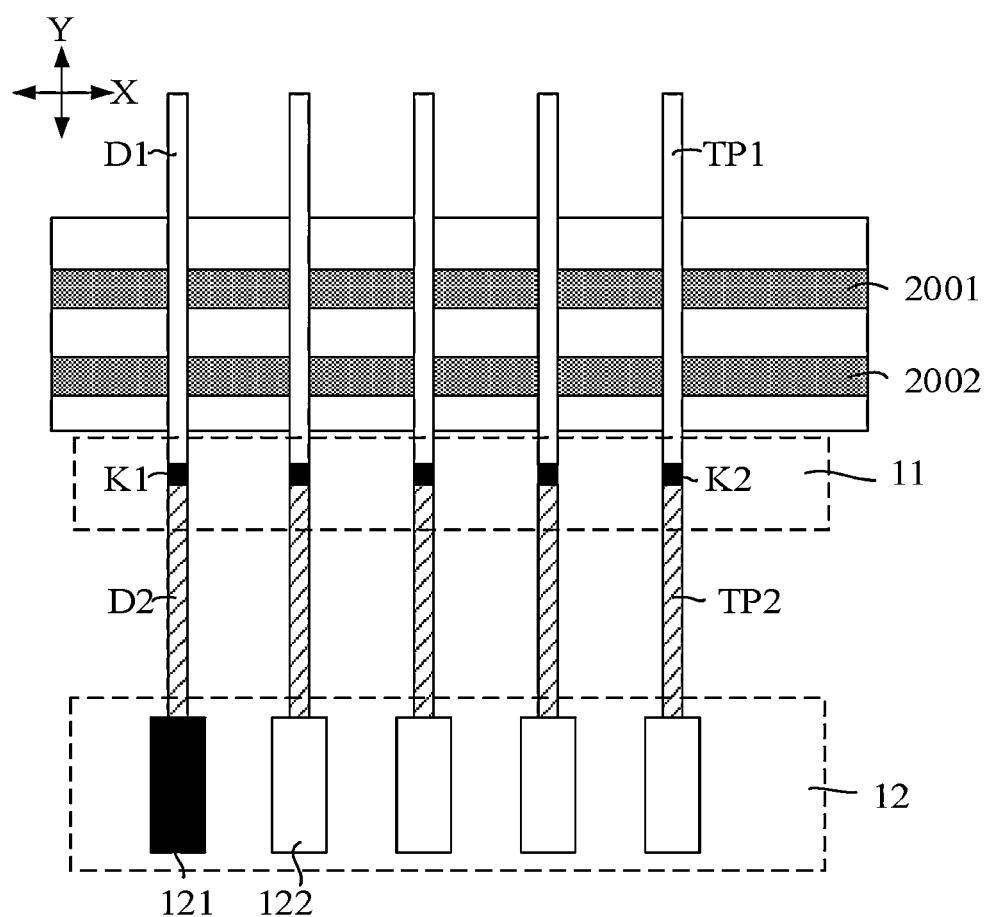
FIG. 20 is a schematic plane diagram of a part of a display panel provided by the embodiments of the application.

FIG. 19 is yet another schematic cross-section view of a display panel provided by the embodiments of the present application. FIG. 20 is a schematic plane diagram of a part of a display panel provided by the embodiments of the application. As shown in FIG. 19 and FIG. 20, according to some embodiments of the present application, alternatively, the display panel 10 includes a first substrate 61, a drive device layer 62, a light-emitting layer 63, a packaging layer 64, and a touch function layer 65. The first substrate 61 may be located in both the display area AA and the non-display area NA. As an example, the first substrate 61 may be a flexible substrate made of a material such as a polyether sulfone (PES), a polyacrylate (PAR), a polyether imide (PEI), a polyethylene naphthalate (PEN), a polyethylene terephthalate (PET), a polyphenylene sulfide (PPS), a polyaryl ester, a polyimide (PI), a polycarbonate (PC) or a cellulose acetate propionate (CAP), or a rigid substrate made of a material such as glass.

The drive device layer 62 may be located on a side of the first substrate 61, and the drive device layer 62 may be configured to arrange an electronic device such as a thin film transistor TFT. The light-emitting layer 63 may be located on a side of the drive device layer 62 away from the first substrate 61. It can be understood that the light-emitting layer 63 is located in the display area AA. As an example, the light-emitting layer 63 includes but not limited to an organic light-emitting layer 63, that is, the material of the light-emitting layer 63 may be an organic light-emitting material. The packaging layer 64 may cover the light-emitting layer 63 and at least part of the non-display area NA. The packaging layer 64 may be a thin film packaging layer, which may specifically include a first inorganic packaging layer 641, an organic packaging layer 642 and a second inorganic packaging layer 643 arranged successively in a direction away from the first substrate 61. The packaging layer 64 may be configured to protect the light-emitting device from water oxygen corrosion.

The non-display area NA is further arranged with a first retaining wall 2001 and a second retaining wall 2002. The first retaining wall 2001 is configured to define a boundary of the organic packaging layer 642 in the packaging layer 64, and the first inorganic packaging layer 641 and the second inorganic packaging layer 643 may be extended to the second retaining wall 2002, which further improves the effect of the packaging layer 64 in blocking water and oxygen.

The touch function layer 65 may be located on a side of the packaging layer 64 away from the first substrate 61, and the touch function layer 65 may be extended from the display area AA into the transfer area 11. The touch function layer 65 may be arranged with the first touch signal line TP1 and the touch electrode.

The transfer area 11 is arranged with a first transfer hole K1 and a second transfer hole K2. The first transfer hole K1 may be configured to connect the first ground line D1 and the second ground line D2, and the second transfer hole K2 may be configured to connect the first touch signal line TP1 and the second touch signal line TP2. For example, the first transfer unit 111 may be the first transfer hole K1, and the second transfer unit 112 may be the second transfer hole K2.

The impedance of the second ground line D2 may be smaller than the impedance of the second touch signal line TP2. In this way, since the impedance of the second ground line D2 is smaller than the impedance of the second touch signal line TP2, the static electricity in the TPOP display panel will be released preferentially through the routing where the second ground line D2 with relatively smaller impedance is located. Therefore, the affection of the static electricity on the touch signal line and its connected touch electrode is reduced, and the electrostatic protection capability of the TPOP display panel is improved.

As shown in FIG. 19 and FIG. 20, according to some embodiments of the present application, alternatively, the transfer area 11 and the binding area 12 are arranged with a drive device layer 62. The drive device layer 62 includes a plurality of metal layers and insulating layers each between any two of the metal layers which are arranged to be stacked with one another. One of the metal layers of the drive device layer 62 may be reused as a film layer where the second touch signal line TP2 is located.

In this way, by reusing one of the metal layers in the drive device layer 62 to prepare the second touch signal line TP2, the number of film layers may be reduce, the thickness of the display panel is reduced, which facilitates a lightweight design.

As shown in FIG. 19 and FIG. 20, according to some embodiments of the present application, alternatively, the electrostatic protection circuit 90 is arranged in the drive device layer 62 of the transfer area 11 and the binding area 12. For example, in the second direction Y, a target area P between the second transfer hole K2 and the second binding pad 122 is arranged with the drive device layer 62, and the electrostatic protection circuit 90 may be arranged in the drive device layer 62 of the target area P.

In this way, by using the drive device layer 62 in the target area P between the transfer area 11 and the binding area 12 to prepare the electrostatic protection circuit 90, a sufficient use of the materials and space may be realized, while a better electrostatic protection for the routing where the second transfer hole K2 is located is realized, which avoids the affection of the static electricity on the touch electrode and touch signal line, and improves the electrostatic protection capability of the TPOP display panel.

According to some embodiments of the present application, alternatively, the display panel 10 may be a self-capacitance touch display panel. The following will describe in detail the examples of the display panel 10 which is a self-capacitance touch display panel.

Figure 21:
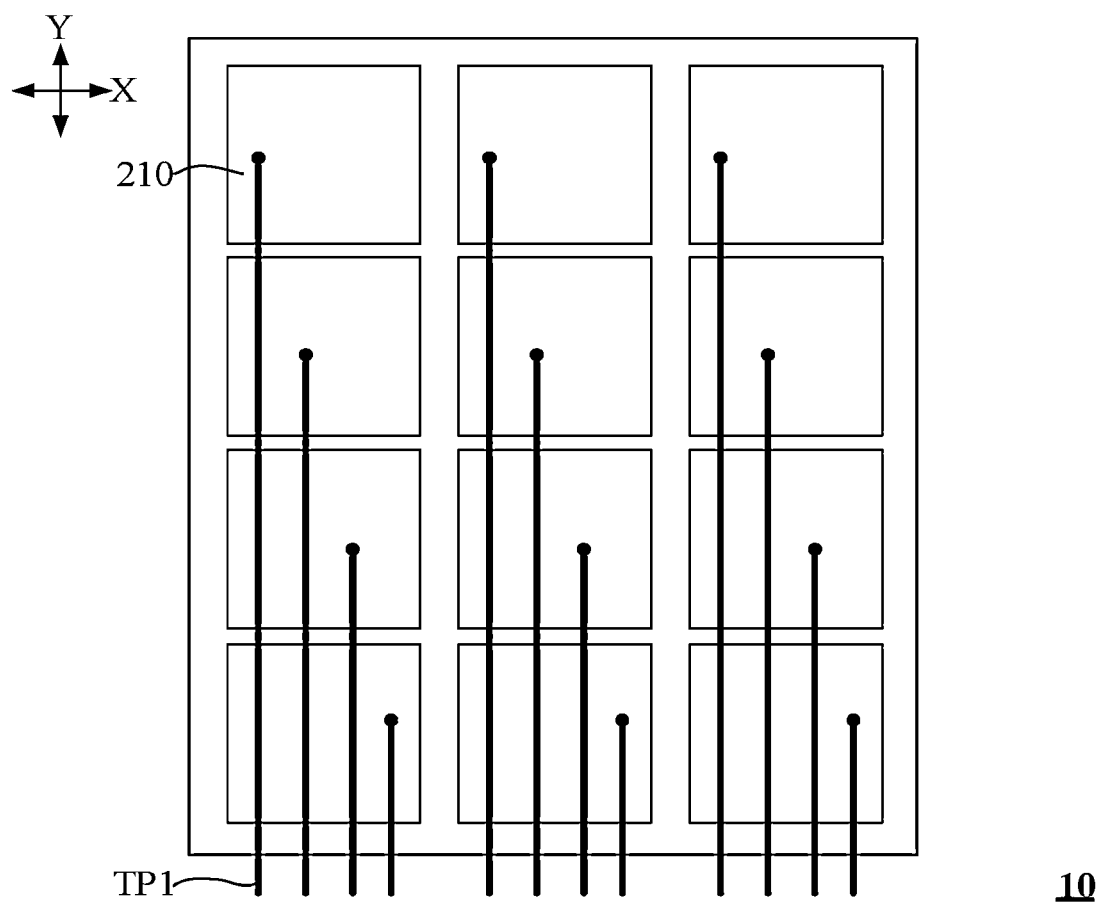
FIG. 21 is yet another schematic plane diagram of a display panel provided by the embodiments of the application.

FIG. 21 is yet another schematic plane diagram of a display panel provided by the embodiments of the application. As shown in FIG. 21, according to some embodiments of the application, alternatively, the display panel 10 may include a plurality of touch electrodes 210 and a plurality of first touch signal lines TP1, and the plurality of first touch signal lines TP1 are electrically connected with the plurality of touch electrodes 210 one to one. Each touch electrode 210 receives a touch drive signal through a corresponding first touch signal line TP1, and transmits a generated touch sensing signal back to a touch chip through the same first touch signal line TP1.

According to some embodiments of the present application, alternatively, the display panel 10 may be a mutual capacitance touch display panel. The following will describe in detail the examples of the display panel 10 which is a mutual capacitance touch display panel.

Figure 22:
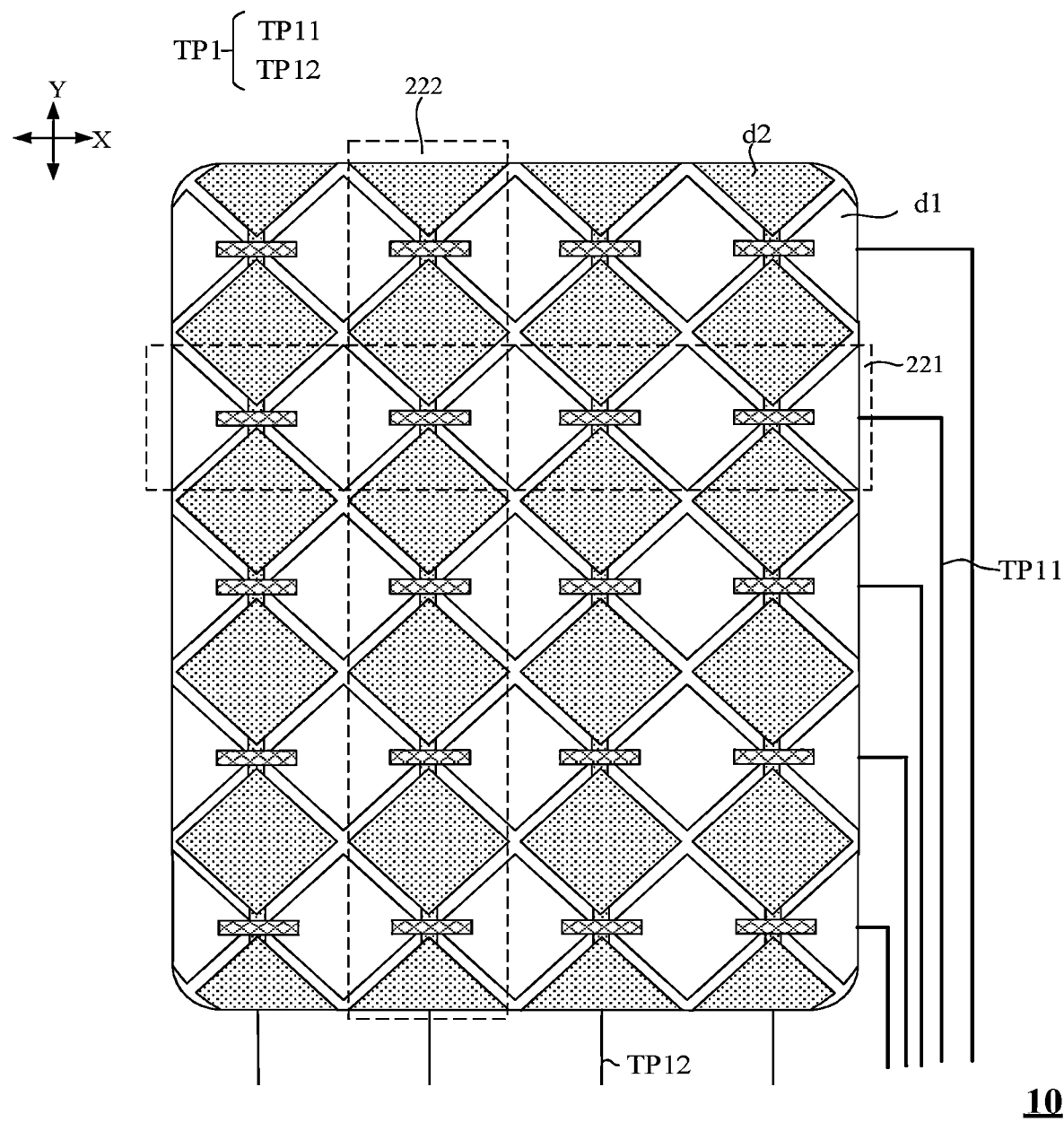
FIG. 22 is yet another schematic plane diagram of a display panel provided by the embodiments of the application.

FIG. 22 is yet another schematic plane diagram of a display panel provided by the embodiments of the application. As shown in FIG. 22, according to some embodiments of the present application, alternatively, the display panel 10 may include a plurality of first touch electrodes 221 and a plurality of second touch electrodes 222, and the first touch electrodes 221 and the second touch electrodes 222 are insulated from one another. The first touch electrode 221 may include a plurality of first electrode units d1 electrically connected with one another, and the plurality of first electrode units d1 are arranged in the first direction X. The second touch electrode 222 may include a plurality of second electrode units d2 electrically connected with one another, and the plurality of second electrode units d2 are arranged in the second direction Y. The first touch electrode 221 and the second touch electrode 222 may be electrically connected with different first touch signal lines TP1. In some examples, the first touch signal line TP1 may include a touch drive signal line TP11 and a touch sensing signal line TP12. The first touch electrode 221 may be electrically connected with the touch drive signal line TP11, and the second touch electrode 222 may be electrically connected with the touch sensing signal line TP12.

Figure 23:
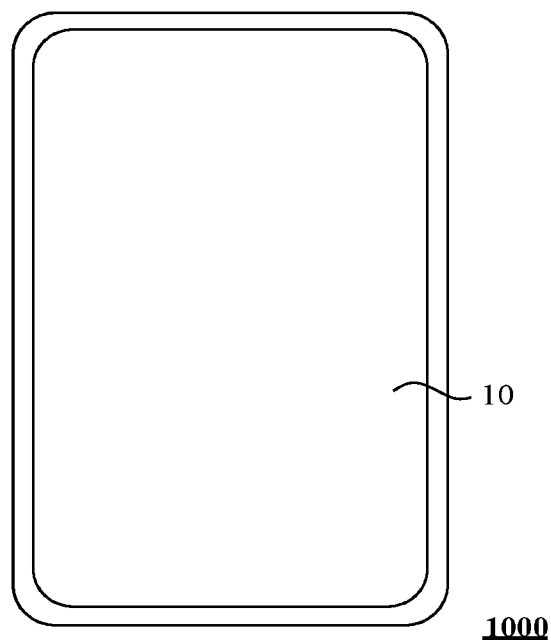
FIG. 23 is a schematic diagram of a structure of a display apparatus provided by the embodiments of the present application.

Based on the display panel provided by the above embodiments, correspondingly, the present application further provides a display apparatus including the display panel provided by the present application. Please refer to FIG. 23, FIG. 23 is a schematic diagram of a structure of a display apparatus provided by the embodiments of the present application. The display apparatus 1000 provided in FIG. 23 includes the display panel 10 provided by any of the above embodiments of the present application. The embodiment of FIG. 23 only takes a mobile phone as an example to describe the display apparatus 1000. It can be understood that the display apparatus provided by the embodiments of the present application may be a wearable product, a computer, a TV, a vehicle-mounted display apparatus, and other devices with a display function, which is not specifically limited in the application. The display apparatus provided by the embodiments of the present application has the beneficial effects of the display panel 10 provided by the embodiments of the present application. For details, reference may be made to the specific descriptions of the display panel 10 in the above-mentioned embodiments, which will not be repeated in this embodiment.

It should be understood that the specific structures of the circuits and the cross-sectional structures of the display panel provided in the accompanying drawings of the embodiments of the present application are only some examples, and are not intended to limit the present application. In addition, the above-mentioned embodiments provided by the present application may be combined with one another if there is no contradiction.

It should be noted that all embodiments in the description are described in a progressive manner, and the same or similar parts of the respective embodiments may be referred to each other. Each embodiment focuses on the differences with other embodiments. According to the embodiments of the present application as described above, these embodiments do not describe all details in detail, nor do they limit the application to be only the specific embodiments described. Obviously, according to the above description, many modifications and changes may be made. These embodiments are selected and specifically described in this specification in order to better explain the principle and practical application of this application, so that those skilled in the art may make good use of this application and modify it on the basis of this application. This application is only limited by the claims and their scopes and equivalents.

Those skilled in the art should understand that the above embodiments are exemplary rather than restrictive. Different technical features in different embodiments may be combined to achieve beneficial effects. Those skilled in the art should understand and realize other changed embodiments for the disclosed embodiments on the basis of studying the drawings, the description and the claims. In the claims, the term "comprising" does not exclude other structures; the quantity involves "one" does not exclude multiple; the terms "first" and "second" are used to designate names and not to indicate any particular order. Any reference numerals in the claims shall not be construed as limiting the protection scope. The presence of certain technical features in different dependent claims does not mean that these technical features cannot be combined to obtain beneficial effects.

What is claimed is:

1. A display panel comprising a display area and a non-display area located at least one side of the display area, wherein the non-display area comprises a transfer area and a binding area, the transfer area is located at a side of the binding area close to the display area, and the transfer area comprises:
- a first transfer unit electrically connected with a first ground line in the display area; and
- a second transfer unit electrically connected with a first touch signal line in the display area,
- wherein the binding area comprises a first binding pad and a second binding pad, and the first binding pad and the second binding pad are configured to connect with a flexible circuit board or a drive chip,
- wherein the first transfer unit and the first binding pad are electrically connected through a second ground line located in the non-display area, and the second transfer unit and the second binding pad are electrically connected through a second touch signal line located in the non-display area, and
- wherein an impedance of the second ground line is smaller than an impedance of the second touch signal line.

2. The display panel according to claim 1, wherein a size of the first transfer unit is larger than a size of the second transfer unit, and
- wherein a cross-sectional area of the second ground line is larger than a cross-sectional area of the second touch signal line.

3. The display panel according to claim 1, wherein the first transfer unit comprises a plurality of sub-transfer units arranged to be spaced apart from one another, and the plurality of sub-transfer units are connected in series or in parallel to be electrically connected with the first binding pad through at least one second ground line.

4. The display panel according to claim 1, wherein the display panel further comprises an impedance unit connected in series with the second touch signal line, and
- wherein the display panel comprises a first substrate and a drive device layer stacked with each other, the drive device layer comprises an active layer and at least one metal layer, the impedance unit is located in the active layer or the metal layer, and the second touch signal line is electrically connected with the impedance unit through a first via.

5. The display panel according to claim 1, wherein the first ground line comprises a first sub-ground line and a second sub-ground line;
- the first transfer unit comprises a first sub-transfer unit and a second sub-transfer unit, the first sub-transfer unit is electrically connected with the first sub-ground line, and the second sub-transfer unit is electrically connected with the second sub-ground line;
- the first binding pad comprises a first sub-binding pad and a second sub-binding pad, the second ground line comprises a third sub-ground line and a fourth sub-ground line, the first sub-transfer unit and the first sub-binding pad are electrically connected through the third sub-ground line located in the non-display area, and the second sub-transfer unit and the second sub-binding pad are electrically connected through the fourth sub-ground line located in the non-display area; and
- an impedance of the third sub-ground line is smaller than or equal to an impedance of the fourth sub-ground line, and the impedance of the fourth sub-ground line is smaller than the impedance of the second touch signal line.

6. The display panel according to claim 1, wherein the display panel further comprises an electrostatic protection circuit, a first power supply voltage signal line and a second power supply voltage signal line, the electrostatic protection circuit is electrically connected with the second transfer unit, the first power supply voltage signal line and the second power supply voltage signal line, and the electrostatic protection circuit is configured to transmit static electricity on the second transfer unit to at least one of the first power supply voltage signal line and the second power supply voltage signal line.

7. The display panel according to claim 6, wherein the electrostatic protection circuit comprises a first switch unit and a second switch unit, wherein
- each of a control terminal of the first switch unit and a first terminal of the first switch unit is electrically connected with the first power supply voltage signal line, and a second terminal of the first switch unit is electrically connected with the second transfer unit; and
- each of a control terminal of the second switch unit and a first terminal of the second switch unit is electrically connected with the second transfer unit, and a second terminal of the second switch unit is electrically connected with the second power supply voltage signal line.

8. The display panel according to claim 7, wherein the first switch unit comprises a first transistor and a second transistor, and the second switch unit comprises a third transistor and a fourth transistor, wherein
- each of a gate of the first transistor and a first electrode of the first transistor is electrically connected with the first power supply voltage signal line;
- a gate of the second transistor is electrically connected with the first power supply voltage signal line, a first electrode of the second transistor is electrically connected with a second electrode of the first transistor, and a second electrode of the second transistor is electrically connected with the second transfer unit;
- each of a gate of the third transistor and a first electrode of the third transistor is electrically connected with the second transfer unit; and
- a gate of the fourth transistor is electrically connected with the second transfer unit, a first electrode of the fourth transistor is electrically connected with a second electrode of the third transistor, and a second electrode of the fourth transistor is electrically connected with the second power supply voltage signal line.

9. The display panel according to claim 6, wherein the electrostatic protection circuit comprises:
- a first transistor, wherein a gate of the first transistor is electrically connected with the first power supply voltage signal line, and a first electrode of the first transistor is electrically connected with the first power supply voltage signal line;
- a second transistor, wherein each of a gate of the second transistor and a first electrode of the second transistor is electrically connected with a second electrode of the first transistor, and a second electrode of the second transistor is electrically connected with the second transfer unit;
- a third transistor, wherein each of a gate of the third transistor and a first electrode of the third transistor is electrically connected with the second transfer unit; and
- a fourth transistor, wherein each of a gate of the fourth transistor and a first electrode of the fourth transistor is electrically connected with a second electrode of the third transistor, and a second electrode of the fourth transistor is electrically connected with the second power supply voltage signal line.

10. The display panel according to claim 6, wherein the transfer area comprises a plurality of second transfer units arranged to be spaced apart from one another in a first direction, and each second transfer unit is electrically connected with one first touch signal line, and
wherein the electrostatic protection circuit is located between two adjacent second transfer units in the first direction.

11. The display panel according to claim 6, wherein in a second direction, the display area, the transfer area and the binding area are arranged successively; and
in the second direction, the electrostatic protection circuit is located between the second transfer unit and the second binding pad, and the electrostatic protection circuit is electrically connected with the second touch signal line.

12. The display panel according to claim 6, wherein the display panel comprises an array substrate and a packaging substrate, the array substrate comprises a first substrate, a drive device layer and a light-emitting layer arranged to be stacked with one another, the packaging substrate comprises a second substrate and a touch function layer arranged to be stacked with each other, and the touch function layer is located between the first substrate and the second substrate, and the touch function layer is arranged with the first touch signal line;
in the transfer area, the array substrate is arranged with a first touch overlap pad and a first ground overlap pad, the first touch overlap pad is electrically connected with the second touch signal line, and the first ground overlap pad is electrically connected with the second ground line; and in the transfer area, the packaging substrate is arranged with a second touch overlap pad and a second ground overlap pad, the second touch overlap pad is electrically connected with the first touch signal line and the second touch overlap pad is overlapped with the first touch overlap pad, and the second ground overlap pad is electrically connected with the first ground line;
the first transfer unit comprises the first ground overlap pad, and the second transfer unit comprises the first touch overlap pad.

13. The display panel according to claim 12, wherein the first touch overlap pad is located on a side of the first substrate towards the second substrate, the drive device layer extends into an area between two adjacent second transfer units located in the transfer area, and the electrostatic protection circuit is arranged in the drive device layer between the two adjacent second transfer units.

14. The display panel according to claim 12, wherein the drive device layer extends into the transfer area, the first touch overlap pad is located on a side of the drive device layer of the transfer area which is away from the first substrate, and the electrostatic protection circuit is arranged in the drive device layer located in the transfer area.

15. The display panel according to claim 12, wherein in a second direction, the display area, the transfer area and the binding area are arranged successively;
in the second direction, a target area between the second transfer unit and the second binding pad is arranged with the drive device layer, and the electrostatic protection circuit is arranged in the drive device layer of the target area.

16. The display panel according to claim 12, wherein the display panel comprises:

the first substrate located in both the display area and the non-display area;
the driver device layer located on a side of the first substrate;
the light-emitting layer located on a side of the drive device layer away from the first substrate, wherein the light-emitting layer is located in the display area;
a packaging layer covering the light-emitting layer and at least part of the non-display area; and
the touch function layer located on a side of the packaging layer away from the first substrate, wherein the touch function layer extends from the display area into the transfer area, and the touch function layer is arranged with the first touch signal line,
wherein the transfer area is arranged with a first transfer hole and a second transfer hole, the first transfer hole is configured to connect the first ground line and the second ground line, and the second transfer hole is configured to connect the first touch signal line and the second touch signal line, and
wherein the first transfer unit comprises the first transfer hole, and the second transfer unit comprises the second transfer hole.

17. The display panel according to claim 16, wherein the transfer area and the binding area are arranged with the drive device layer, the drive device layer comprises a plurality of metal layers and insulating layers each between any two of the metal layers which are arranged to be stacked with one another, and one of the metal layers of the drive device layer is reused as a film layer where the second touch signal line is located, and
wherein the electrostatic protection circuit is arranged in the drive device layer of the transfer area and the binding area.

18. The display panel according to claim 1, wherein the display panel comprises a plurality of touch electrodes and a plurality of first touch signal lines, the plurality of first touch signal lines are electrically connected with the plurality of touch electrodes, and each touch electrode receives a touch drive signal through a corresponding first touch signal line, and transmits a generated touch sensing signal back to a touch chip through the same first touch signal line.

19. The display panel according to claim 1, wherein the display panel comprises a plurality of first touch electrodes and a plurality of second touch electrodes, and the first touch electrodes and the second touch electrodes are insulated from one another; the first touch electrode comprises a plurality of first electrode units electrically connected with one another, and the plurality of first electrode units are arranged in a first direction; the second touch electrode comprises a plurality of second electrode units electrically connected with one another, the plurality of second electrode units are arranged in a second direction, and the first direction intersects with the second direction, and
wherein the first touch electrodes and the second touch electrodes are electrically connected with different first touch signal lines.

20. A display apparatus comprising a display panel, wherein the display panel comprises a display area and a non-display area located at least one side of the display area, wherein the non-display area comprises a transfer area and a binding area, the transfer area is located at a side of the binding area close to the display area, and the transfer area comprises:
a first transfer unit electrically connected with a first ground line in the display area; and a second transfer unit electrically connected with a first touch signal line in the display area, wherein the binding area comprises a first binding pad and a second binding pad, and the first binding pad and the second binding pad are configured to connect with a flexible circuit board or a drive chip, wherein the first transfer unit and the first binding pad are electrically connected through a second ground line located in the non-display area, and the second transfer unit and the second binding pad are electrically connected through a second touch signal line located in the non-display area, and wherein an impedance of the second ground line is smaller than an impedance of the second touch signal line.

* * * * *